US011204271B2

(12) United States Patent
Williams et al.

(10) Patent No.: US 11,204,271 B2
(45) Date of Patent: Dec. 21, 2021

(54) SYSTEMS AND METHODS FOR ALTERNATIVE FUEL LIFE-CYCLE TRACKING AND VALIDATION

(71) Applicant: Gilbarco Inc., Greensboro, NC (US)

(72) Inventors: Rodger K. Williams, Siler City, NC (US); Edward A. Payne, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 902 days.

(21) Appl. No.: 15/370,806

(22) Filed: Dec. 6, 2016

(65) Prior Publication Data

US 2017/0160118 A1    Jun. 8, 2017

Related U.S. Application Data

(60) Provisional application No. 62/264,717, filed on Dec. 8, 2015.

(51) Int. Cl.
*G01F 9/00* (2006.01)
*H04L 29/08* (2006.01)

(52) U.S. Cl.
CPC ................ *G01F 9/00* (2013.01); *H04L 67/12* (2013.01)

(58) Field of Classification Search
None
See application file for complete search history.

(56) References Cited

U.S. PATENT DOCUMENTS

| 2,911,958 A | 11/1959 | Griep |
| 3,912,543 A | 10/1975 | Delahunt |
| 4,323,046 A | 4/1982 | Barber |

(Continued)

FOREIGN PATENT DOCUMENTS

| DE | 4131626 A1 | 3/1993 |
| DE | 19823335 A1 | 12/1999 |

(Continued)

OTHER PUBLICATIONS

Adam Christensen, Stephanie Searle, and Chris Malins, A Conversational Guide to . . . Renewable Identification Numbers (RINs) in the U.S. Renewable Fuel Standard, ICCT, May 2014 (Year: 2014).*

(Continued)

*Primary Examiner* — Lina M Cordero
(74) *Attorney, Agent, or Firm* — Nelson Mullins Riley & Scarborough LLP

(57) ABSTRACT

A method for alternative fuel life-cycle tracking includes electronically receiving, at a remote server, fuel data of fuel in a first container. The fuel comprises first and second batches. The fuel data includes first and second sets of alternative fuel identifiers (AFIs) associated with, respectively, a first unit of the first batch and a second unit of the second batch. The method further includes electronically receiving, at the remote server, a transfer volume of the fuel being transferred to a second container. The method further includes electronically transferring, at the remote server, first and second subsets, respectively, of the first and second sets of AFIs to be associated with the second container. The transfer of the first and second subsets is based on the transfer volume and a proportion of the first unit to the second unit.

18 Claims, 20 Drawing Sheets

(56) References Cited

U.S. PATENT DOCUMENTS

| | | |
|---|---|---|
| 4,345,141 A | 8/1982 | Little |
| 4,413,604 A | 11/1983 | Tune |
| 4,471,744 A | 9/1984 | Holtz |
| 4,572,133 A | 2/1986 | Bago |
| 4,712,516 A | 12/1987 | Eberhardt |
| 4,865,005 A | 9/1989 | Griffith |
| 4,964,376 A | 10/1990 | Veach et al. |
| 5,105,063 A | 4/1992 | Hockemier |
| 5,237,978 A | 8/1993 | Bailey |
| 5,245,953 A | 8/1993 | Shimada et al. |
| 5,271,370 A | 12/1993 | Shimada et al. |
| 5,336,396 A | 8/1994 | Shetley |
| 5,443,053 A | 8/1995 | Johnson |
| 5,450,832 A | 9/1995 | Graf |
| 5,469,830 A | 11/1995 | Gonzalez |
| 5,505,177 A | 4/1996 | Herdin et al. |
| 5,662,090 A | 9/1997 | Ward |
| 5,775,308 A | 7/1998 | Headley |
| 5,911,210 A | 6/1999 | Flach |
| 6,016,457 A | 1/2000 | Toukura et al. |
| 6,035,837 A | 3/2000 | Cohen et al. |
| 6,112,151 A | 8/2000 | Kruse |
| 6,145,494 A | 11/2000 | Klopp |
| 6,260,539 B1 | 7/2001 | Minowa et al. |
| 6,370,472 B1 | 4/2002 | Fosseen |
| 6,382,170 B1 | 5/2002 | Mang et al. |
| 6,494,192 B1 | 12/2002 | Capshaw et al. |
| 6,668,804 B2 | 12/2003 | Dobryden et al. |
| 6,687,597 B2 | 2/2004 | Sulatisky et al. |
| 6,698,387 B1 | 3/2004 | McFarland et al. |
| 6,839,619 B2 | 1/2005 | Bellinger |
| 6,957,542 B1 | 10/2005 | Kido et al. |
| 7,019,626 B1 | 3/2006 | Funk |
| 7,044,103 B2 | 5/2006 | May |
| 7,107,942 B2 | 9/2006 | Weissman et al. |
| 7,353,810 B1 | 4/2008 | Blaschke |
| 7,581,528 B2 | 9/2009 | Stein et al. |
| 7,640,913 B2 | 1/2010 | Blumberg et al. |
| 7,650,878 B2 | 1/2010 | Kleinberger |
| 7,721,720 B2 | 5/2010 | Payne et al. |
| 7,841,317 B2 | 11/2010 | Williams et al. |
| 7,913,664 B2 | 3/2011 | Williams et al. |
| 8,006,677 B2 | 8/2011 | Williams et al. |
| 8,256,401 B2 | 9/2012 | Payne et al. |
| 8,485,165 B2 | 7/2013 | Payne et al. |
| 8,640,678 B2 | 2/2014 | Payne et al. |
| 8,726,893 B2 | 5/2014 | Williams et al. |
| 8,893,691 B2 | 11/2014 | Payne et al. |
| 9,458,772 B2 | 10/2016 | Williams et al. |
| 2002/0011491 A1 | 1/2002 | Rosen et al. |
| 2002/0152999 A1 | 10/2002 | Holder et al. |
| 2005/0028791 A1 | 2/2005 | Niimi |
| 2005/0072384 A1 | 4/2005 | Hadley et al. |
| 2006/0081230 A1 | 4/2006 | Kangler |
| 2007/0062496 A1 | 3/2007 | Snower et al. |
| 2007/0119429 A1 | 5/2007 | Jacquay |
| 2008/0262701 A1 | 10/2008 | Williams et al. |
| 2013/0164807 A1* | 6/2013 | Foody .................... C10G 47/00 435/166 |
| 2013/0225885 A1* | 8/2013 | Foody .................... C10G 47/00 585/254 |
| 2013/0304360 A1 | 11/2013 | Payne et al. |
| 2014/0222698 A1* | 8/2014 | Potdar ................. G06Q 30/018 705/317 |
| 2015/0053304 A1* | 2/2015 | Huwyler ................. B67D 7/04 141/1 |
| 2015/0252386 A1* | 9/2015 | Foody ....................... C10L 3/08 435/167 |
| 2015/0315502 A1* | 11/2015 | Foody .................... C07C 37/68 518/703 |
| 2016/0019482 A1* | 1/2016 | Venhoff ............. G06Q 10/0639 705/7.38 |
| 2016/0102618 A1 | 4/2016 | Payne et al. |
| 2016/0298046 A1* | 10/2016 | Tait ........................... C10L 5/04 |

FOREIGN PATENT DOCUMENTS

| | | |
|---|---|---|
| DE | 19922748 A1 | 11/2000 |
| DE | 10217664 A1 | 11/2003 |
| EP | 1790839 A2 | 5/2007 |
| JP | 2003065094 A | 3/2003 |
| JP | 2004190935 A | 7/2004 |
| WO | 2006005930 A2 | 1/2006 |

OTHER PUBLICATIONS

ARB Staff Discussion of the Renewable Identification Number (Year: 2007).*

International Search Report for International Patent Application No. PCT/US2007/061347, dated Dec. 13, 2007, 3 pages.

International Preliminary Report on Patentability for International Patent Application No. PCT/US2007/061347, dated Aug. 5, 2008, 4 pages.

Final Office Action for U.S. Appl. No. 14/878,582, dated Nov. 13, 2017, 6 pages.

Notice of Allowance for U.S. Appl. No. 14/878,582, dated Jan. 22, 2018, 8 pages.

Non-Final Office Action for U.S. Appl. No. 15/973,038, dated Sep. 28, 2018, 7 pages.

Author Unknown, "The Frybrid System," Frybrid Diesel/Vegetable Oil, available at http://www.frybrid.com/frybrid.htm, accessed Aug. 23, 2005, 2 pages.

Author Unknown, "Deluxe Greasecar Conversion Kit," Product Detail, Greasecar Vegetable Fuel Systems, available at http://greasecar.com/product_detail.cfm, accessed Aug. 23, 2005, 2 pages.

Advisory Action for U.S. Appl. No. 11/748,022, dated Nov. 29, 2011, 3 pages.

Non-Final Office Action for U.S. Appl. No. 11/748,022, dated Nov. 29, 2010, 7 pages.

Non-Final Office Action for U.S. Appl. No. 11/696,765, dated May 28, 2009, 9 pages.

Final Office Action for U.S. Appl. No. 11/346,052, dated Nov. 30, 2010, 7 pages.

Non-Final Office Action for U.S. Appl. No. 11/346,052, dated Apr. 28, 2010, 7 pages.

Non-Final Office Action for U.S. Appl. No. 11/346,052, dated Nov. 30, 2007, 5 pages.

Final Office Action for U.S. Appl. No. 11/346,052, dated Apr. 17, 2008, 6 pages.

Non-Final Office Action for U.S. Appl. No. 11/346,052, dated Apr. 10, 2007, 6 pages.

Notice of Allowance for U.S. Appl. No. 12/105,823, dated Aug. 6, 2010, 5 pages.

Non-Final Office Action for U.S. Appl. No. 12/105,823 dated Apr. 13, 2010, 4 pages.

Non-Final Office Action for U.S. Appl. No. 13/073,242 dated Dec. 4, 2012, 8 pages.

Non-Final Office Action for U.S. Appl. No. 12/718,722 dated Dec. 20, 2012, 10 pages.

Notice of Allowance for U.S. Appl. No. 12/718,722 dated May 1, 2013, 8 pages.

Final Office Action for U.S. Appl. No. 13/073,242, dated Mar. 13, 2013, 6 pages.

Advisory Action for U.S. Appl. No. 13/073,242, dated May 16, 2013, 3 pages.

Non-Final Office Action for U.S. Appl. No. 13/073,242, dated Jul. 1, 2013, 9 pages.

Non-Final Office Action for U.S. Appl. No. 13/567,315, dated Jul. 23, 2013, 9 pages.

Non-Final Office Action for U.S. Appl. No. 13/942,057, dated Jan. 14, 2014, 6 pages.

Final Office Action for U.S. Appl. No. 13/942,057, dated Jul. 3, 2014, 7 pages.

Non-Final Office Action for U.S. Appl. No. 14/281,313, dated Jun. 18, 2015, 12 pages.

Notice of Allowance for U.S. Appl. No. 14/281,313, dated Jun. 2, 2016, 5 pages.

(56) References Cited

OTHER PUBLICATIONS

Non-Final Office Action for U.S. Appl. No. 14/878,582, dated Mar. 22, 2017, 4 pages.
Notice of Allowance for U.S. Appl. No. 15/973,038, dated Jan. 28, 2019, 7 pages.

* cited by examiner

| FEEDSTOCK | CI (WELL-TO-WHEEL) | INDIRECT LAND USE CHANGE | TOTAL CI (gCO$_2$e/MJ) |
|---|---|---|---|
| CORN OIL | 4 | 0 | 4.00 |
| USED COOKING OIL | 11.76-18.72 | 0 | 11.76-18.72 |
| TALLOW | 34.11 | 0 | 34.11 |
| ANIMAL FAT | 40.18 | 0 | 40.18 |
| CANOLA | 31.99 | 31 | 62.99 |
| SOYBEAN | 21.25 | 62 | 83.25 |

AFI Tracking

Immixt Fleet Vehicle Details for Year - 2016    VIN_ESN-Immixt ID: 1FTNF2BF9YEA28976-F9TE9B21-3271

*Fleet List / Fleet YTD / Fleet History / Fleet Year / Fleet Details / Fleet Vehicle*

For the specified vin, list the detailed information for the vehicle by day for the year.

| Day | Route | Saving vs. Diesel | Total Gallons | Diesel Gallons | Renewable Feedstock Gallons | Total RINs | Total RINs Value | Total Carbon Credits | LCFS BioD001 | LCFS BioD002 | LCFS BioD003 | LCFS BioD004 | LCFS BioD005 | LCFS BioD006 | LCFS BioD007 | LCFS BioD008 | LCFS BioD009 |
|---|---|---|---|---|---|---|---|---|---|---|---|---|---|---|---|---|---|
| 03/09/2016 | ○ | $0.00 | 1.06 | 1.06 | 0.00 | 0.00 | $0.00 | $0.00 | 0.00 | 0.00 | 0.00 | 0.00 | 0.00 | 0.00 | 0.00 | 0.00 | 0.00 |
| 03/10/2016 | ○ | $1.20 | 3.81 | 3.25 | 0.56 | 0.96 | $0.65 | $0.55 | 0.00 | 0.00 | 0.00 | 0.00 | 0.00 | 0.00 | 0.56 | 0.00 | 0.00 |
| 03/11/2016 | ○ | $0.59 | 0.65 | 0.38 | 0.27 | 0.47 | $0.32 | $0.27 | 0.00 | 0.00 | 0.00 | 0.00 | 0.00 | 0.00 | 0.27 | 0.00 | 0.00 |
| 03/18/2016 | ○ | $0.09 | 0.22 | 0.18 | 0.04 | 0.07 | $0.05 | $0.04 | 0.00 | 0.00 | 0.00 | 0.00 | 0.00 | 0.00 | 0.04 | 0.00 | 0.00 |
| 03/22/2016 | ○ | $0.09 | 0.27 | 0.22 | 0.04 | 0.07 | $0.05 | $0.04 | 0.00 | 0.00 | 0.00 | 0.00 | 0.00 | 0.00 | 0.04 | 0.00 | 0.00 |
| 08/10/2016 | ○ | $0.89 | 0.46 | 0.04 | 0.42 | 0.71 | $0.48 | $0.41 | 0.00 | 0.00 | 0.00 | 0.00 | 0.00 | 0.00 | 0.42 | 0.00 | 0.00 |
| 08/14/2016 | ○ | $0.00 | 0.29 | 0.29 | 0.00 | 0.00 | $0.00 | $0.00 | 0.00 | 0.00 | 0.00 | 0.00 | 0.00 | 0.00 | 0.00 | 0.00 | 0.00 |
| 08/25/2016 | ○ | $1.03 | 0.53 | 0.05 | 0.48 | 0.82 | $0.56 | $0.47 | 0.00 | 0.00 | 0.00 | 0.00 | 0.00 | 0.00 | 0.48 | 0.00 | 0.00 |
| 08/27/2016 | ○ | $0.31 | 0.29 | 0.14 | 0.14 | 0.25 | $0.17 | $0.14 | 0.00 | 0.00 | 0.00 | 0.00 | 0.00 | 0.00 | 0.14 | 0.00 | 0.00 |
| 10/02/2016 | ○ | $0.00 | 0.48 | 0.48 | 0.00 | 0.00 | $0.00 | $0.00 | 0.00 | 0.00 | 0.00 | 0.00 | 0.00 | 0.00 | 0.00 | 0.00 | 0.00 |
| 10/03/2016 | ○ | $1.72 | 1.64 | 0.83 | 0.80 | 1.37 | $0.93 | $0.79 | 0.00 | 0.00 | 0.00 | 0.00 | 0.00 | 0.00 | 0.80 | 0.00 | 0.00 |
| 10/04/2016 | ○ | $0.96 | 1.50 | 1.05 | 0.45 | 0.76 | $0.52 | $0.44 | 0.00 | 0.00 | 0.00 | 0.00 | 0.00 | 0.00 | 0.45 | 0.00 | 0.00 |
| 10/06/2016 | ○ | $0.00 | 0.75 | 0.75 | 0.00 | 0.00 | $0.00 | $0.00 | 0.00 | 0.00 | 0.00 | 0.00 | 0.00 | 0.00 | 0.00 | 0.00 | 0.00 |
| 10/10/2016 | ○ | $0.00 | 0.12 | 0.12 | 0.00 | 0.00 | $0.00 | $0.00 | 0.00 | 0.00 | 0.00 | 0.00 | 0.00 | 0.00 | 0.00 | 0.00 | 0.00 |

About | Contacts

*FIG. 9E*

AFI Tracking

Cummins Manufacturer Yearly

*Manufacturer List / Manufacturer Yearly*

Contains manufacturer yearly totals.

| Year | # Vehicle | Savings vs. Pure Diesel | Total Gallons | Diesel Gallons | Renewable Feedstock Gallons | Total RINs | Total RINs Value | Total Carbon Credits | LCFS BioD001 | LCFS BioD002 | LCFS BioD003 | LCFS BioD004 | LCFS BioD005 | LCFS BioD006 | LCFS BioD007 | LCFS BioD008 | LCFS BioD009 |
|---|---|---|---|---|---|---|---|---|---|---|---|---|---|---|---|---|---|
| 2012 | 200 | $374,907.35 | 439,720.61 | 264,352.53 | 175,368.08 | 297,616 | $200,376.70 | 172,428.7 | 82,753.04 | 64,849.95 | 273,323.04 | 54,532.12 | 197,361.68 | 315,311.17 | 175,806.08 | 499,848.00 | 81,564.74 |
| 2013 | 200 | $810,498.93 | 604,213.58 | 228,640.04 | 375,573.52 | 643,573 | $437,630.99 | 372,865.9 | 280,273.50 | 467,797.51 | 217,750.73 | 179,388.37 | 441,725.62 | 320,906.28 | 378,573.52 | 72,909.84 | 423,860.21 |
| 2014 | 200 | $554,966.66 | 263,223.34 | 19,334.21 | 263,889.33 | 448,612 | $305,958.07 | 259,918.8 | 383,454.63 | 308,084.80 | 410,466.76 | 605,457.43 | 30,792.19 | 734,537.58 | 263,889.33 | 259,820.38 | 739,290.18 |
| 2015 | 200 | $345.36 | 41.43 | 20.15 | 21.28 | 36 | $24.80 | 21.0 | 0.00 | 0.00 | 0.00 | 0.00 | 0.00 | 0.00 | 21.28 | 0.00 | 0.00 |
| 2016 | 200 | $9.39 | 12.92 | 9.01 | 3.92 | 7 | $4.53 | 3.9 | 0.00 | 0.00 | 0.00 | 0.00 | 0.00 | 0.00 | 3.92 | 0.00 | 0.00 |

About | Contacts

*FIG. 9H*

SYSTEMS AND METHODS FOR ALTERNATIVE FUEL LIFE-CYCLE TRACKING AND VALIDATION

PRIORITY APPLICATION

The present application claims priority to U.S. Provisional Patent Application Ser. No. 62/264,717 filed on Dec. 8, 2015 entitled "RIN, BATCH, FEEDSTOCK AND CO2 FUEL TRACKING METHOD, FROM PRODUCTION TO CONSUMPTION (VALIDATION OF RENEWABLE FUEL LIFE-CYCLE), AND RELATED SYSTEMS AND METHODS," which is incorporated herein by reference in its entirety.

FIELD OF DISCLOSURE

The present disclosure relates to electronically tracking alternative fuel production, transfer, and consumption, and more particularly to systems and methods for alternative fuel life-cycle tracking and validation.

BACKGROUND

The Renewable Fuel Standard (RFS) program of the Environmental Protection Agency (EPA) aims to reduce greenhouse gas emissions, decrease reliance on fossil fuels, and encourage use of alternative fuels (e.g., renewable fuels, biofuels, hydrogen fuels, etc.). This and similar climate control solutions are growing in popularity due to their real-world success, such as British Columbia's revenue-neutral carbon tax and California's Low Carbon Fuel Standard (LCFS) program. Many other U.S. regions are formulating similar plans.

The RFS program (and other similar programs) requires tracking methods to validate renewable fuel production and consumption, to ensure compliance with the RFS program, and to prevent fraud. Implementation of and compliance with the RFS program (e.g., fuel life-cycle tracking) currently relies upon manual documentation using a Product Transfer Document (PTD), and subsequent data entry into the EPA Moderated Transaction System (EMTS). The EMTS provides aggregated monthly data on Renewable Identification Number (RIN) generation and renewable fuel volume production for specific fuel categories. A RIN is an identifier (e.g., a 36 digit number comprising multiple fields) assigned to a particular volumetric unit of renewable fuel (e.g., one RIN per gallon). The assigned RIN is a 36-digit number comprising multiple fields and remains with the renewable fuel until blended and/or consumed (e.g., combusted). Once the fuel is blended and/or consumed, the RIN is "detached" and can then become available for sale and, once posted for sale, retired.

The RFS program maintains that all renewable fuel producers must report and maintain records concerning the type and amount of feedstocks used for each batch of renewable fuel produced (see 40 C.F.R. 80.1451(b)(1)(ii)(K) and 40 C.F.R. 80.1454(b)(3)(vi)), which are then reported directly to the EPA by the producers on a quarterly basis. The RFS documentation includes information regarding categorical use as determined by the producers for the identification of a fuel batch and RIN values of that batch. However, the RFS documentation lacks information on definitive feedstock type and the location from which the feedstock derived. Accordingly, the reporting process does not currently include granularity to determine precise emission values (e.g., carbon intensity values (e.g., $gCO_2e/MJ$), $CO_2$ values, etc.) or to determine the region where the alternative fuel was obtained (which may be used for land use calculations of the fuel to accurately derive precise carbon intensity values).

For renewable biomass recordkeeping and reporting requirements, if a producer (e.g., foreign or domestic) is making renewable fuel using feedstocks that are planted crops or crop residue from existing U.S. agricultural land, then the producer does not need to maintain records for those feedstocks (e.g., the feedstock is subject to the aggregate compliance approach in 40 C.F.R. 80.1454(g)) with certain exceptions (e.g., if the EPA makes a finding that the 2007 baseline amount of U.S. agricultural land has been exceeded and the aggregate compliance approach for such land is terminated). However, if a producer is using any other type of feedstock (e.g., crops or crop residues from existing foreign agricultural land) and either the producer or an importer is generating RINs for that fuel, then the producer must maintain records concerning the type and source of the feedstock for all fuel produced (e.g., pursuant to 40 C.F.R. 80.1454(c) and (d)). Additionally, the producer must report to the EPA on a quarterly basis concerning the source of the feedstocks (e.g., 40 C.F.R. 80.1451(d)). Whether the records and reporting should be done on a per-batch basis depends on the extent to which there is variability in the feedstocks used for different batches. As a result, feedstock may not be tracked by the biodiesel producer, which may lead to inaccurate emission calculations (e.g., due to variance in feedstock, land use, etc.).

Accordingly, the current methods for fuel life-cycle tracking (e.g., including the PTD) rely upon good faith reporting and accuracy of various parties in the supply chain (e.g., the producer, blender, refiner, purchaser, etc.). These methods can be cumbersome, error prone, and susceptible to fraud. In particular, parties (e.g., alternative fuel producers, obligated parties, oil companies, etc.) may forge fake production and/or consumption documents for potential profit, despite the substantial risk of legal penalties, such as federal penalties ranging into the millions, possible prison sentences for companies and individuals, etc. In fact, marketers working with renewable fuel are also demanding transparency and increased oversight.

Further, some state sponsored carbon reduction initiatives (e.g., LCFS) require tracking of location based consumption and validation for compliance with such programs. For example, the California Air Resources Board (CARB) has described tracking feedstock type at the producer level for compliance with LCFS. However, the accounting method used by LCFS does not take into account the location where fuel was consumed, nor does it produce accurate data for CI emissions in real time for mixed feedstock fuels during consumption.

Accordingly, there is an increased desire to track alternative fuel on a more granular basis (e.g., per gallon basis) from production to consumption for confirmation of compliance with government incentive programs (e.g., carbon reduction initiatives by the CARB). Further, current systems fail to account for the region where a feedstock was obtained (e.g., grown) and the type of feedstock used to produce renewable fuel. This inhibits the ability to track alternative fuel back to its source, such as for quality control purposes (e.g., for contamination purposes) or for fuel effectiveness.

SUMMARY

The present disclosure relates to electronically tracking alternative fuel production, transfer, and consumption, and more particularly to systems and methods for alternative fuel life-cycle tracking and validation. In aspects disclosed herein, a system and method for alternative fuel life-cycle tracking comprises a remote server in electronic communication with one or more producers, one or more depots, and/or one or more vehicles. The remote server tracks alternative fuel identifiers (AFIs) (e.g., renewable identification numbers (RINs)) from production to consumption. More specifically, the method comprises electronically receiving, at the remote server, first alternative fuel data of a first alternative fuel in a first container. The first alternative fuel (e.g., renewable fuel, biofuel, biodiesel, etc.) comprises a storage volume comprising a first batch and a second batch. The first alternative fuel data comprises a first set of alternative fuel identifiers (AFI) associated with a first volumetric unit of the first batch and a second set of AFIs associated with a second volumetric unit of the second batch. The method further comprises electronically receiving, at the remote server, a transfer volume (e.g., a subset of the storage volume) of the first alternative fuel being transferred to a second container. The method further comprises automatically electronically transferring, at the remote server, a first subset of the first set of AFIs to be electronically associated with the second container and a second subset of the second set of AFIs to be electronically associated with the second container. The transfer of the first subset and second subset is based on the transfer volume, and is also based on a first volumetric proportion of the first volumetric unit (of the first batch) to the second volumetric unit (of the second batch). In this way, the system and method allow for the electronic proportional tracking of AFIs (in real time) and proportional release of AFIs associated with alternative fuel. This system and method can be automated to streamline reporting efforts, increase reporting accuracy, and decrease fraud. It also allows for real-time tracking, more accurate release of AFIs, and the ability to choose fuel consumption to maximize cost efficiency (e.g., based on governmental incentives, etc.) and/or fuel efficiency, among other advantages (e.g., the ability to track contaminated feedstock back to its source).

One embodiment is a method for alternative fuel tracking. The method comprises electronically receiving, at a remote server, first alternative fuel data of a first alternative fuel in a first container. The first alternative fuel comprises a storage volume comprising a first batch and a second batch. The first alternative fuel data comprises a first set of alternative fuel identifiers (AFIs) associated with a first volumetric unit of the first batch and a second set of AFIs associated with a second volumetric unit of the second batch. The method further comprises electronically receiving, at the remote server, a transfer volume of the first alternative fuel being transferred to a second container, the transfer volume being a subset of the storage volume. The method further comprises automatically electronically transferring, at the remote server, a first subset of the first set of AFIs to be electronically associated with the second container and a second subset of the second set of AFIs to be electronically associated with the second container. The transfer of the first subset and second subset is based on the transfer volume and based on a first volumetric proportion of the first volumetric unit of the first batch to the second volumetric unit of the second batch.

Another embodiment is a system for alternative fuel life-cycle tracking. The system comprises a remote server and an alternative fuel identifier (AFI) tracking engine. The remote server is in electronic communication with an electronic communication device of a first container and an electronic communication device of a second container, the remote server comprising a processor and a memory coupled to the processor. The AFI tracking engine is electronically stored in the memory of the remote server, and is configured to: electronically receive first alternative fuel data of a first alternative fuel in the first container, the first alternative fuel comprising a storage volume comprising a first batch and a second batch, and the first alternative fuel data comprising a first set of alternative fuel identifiers (AFIs) associated with a first volumetric unit of the first batch and a second set of AFIs associated with a second volumetric unit of the second batch; electronically receive a transfer volume of the first alternative fuel being transferred to the second container, the transfer volume being a subset of the storage volume; and automatically electronically transfer a first subset of the first set of AFIs to be electronically associated with the second container and a second subset of the second set of AFIs to be electronically associated with the second container, the transfer of the first subset and second subset being based on the transfer volume and based on a first volumetric proportion of the first volumetric unit of the first batch to the second volumetric unit of the second batch.

BRIEF DESCRIPTION OF THE DRAWINGS

FIG. 9B is a fleet list page provided by the AFI tracking system of FIGS. 1, 3 and 5 illustrating a vehicle list within a fleet of vehicles, according to one embodiment;

FIG. 9C is a fleet list page provided by the AFI tracking system of FIGS. 1, 3 and 5 illustrating summary fleet history information, according to one embodiment;

FIG. 9E is a fleet vehicle history page provided by the AFI tracking system of FIGS. 1, 3 and 5 illustrating a fleet vehicle history for a selected vehicle in the fleet of vehicles, according to one embodiment;

FIG. 9H is a manufacturer yearly totals page provided by the AFI tracking system of FIGS. 1, 3 and 5 illustrating total vehicles yearly totals for a selected engine manufacturer, according to one embodiment;

DETAILED DESCRIPTION

Embodiments of the disclosure are directed to systems and methods for alternative fuel life-cycle tracking and validation. In aspects disclosed herein, a system for alternative fuel life-cycle tracking comprises a remote server in electronic communication with one or more producers, one or more depots, and one or more vehicles. The remote server tracks alternative fuel identifiers (AFIs) (e.g., renewable identification numbers (RINs)) from production to consumption. More specifically, the method comprises electronically receiving, at the remote server, first alternative fuel data of a first alternative fuel in a first container. The first alternative fuel (e.g., renewable fuel, biofuel, biodiesel, etc.) comprises a storage volume comprising a first batch and a second batch. The first alternative fuel data comprises a first set of AFIs associated with a first volumetric unit of the first batch and a second set of AFIs associated with a second volumetric unit of the second batch. The method further comprises electronically receiving, at the remote server, a transfer volume (e.g., a subset of the storage volume) of the first alternative fuel being transferred to a second container. The method further comprises automatically electronically transferring, at the remote server, a first subset of the first set of AFIs to be electronically associated with the second container and a second subset of the second set of AFIs to be electronically associated with the second container. The transfer of the first subset and second subset is based on the transfer volume, and is also based on a first volumetric proportion of the first volumetric unit (of the first batch) to the second volumetric unit (of the second batch). In this way, the system and method allow for the electronic proportional tracking of AFIs (in real time) and proportional release of AFIs associated with alternative fuel. This system and method can be automated to streamline reporting efforts, increase reporting accuracy, and decrease fraud. It also allows for real-time tracking, more accurate release of RINs, and the ability to choose fuel consumption to maximize cost efficiency (e.g., based on governmental incentives, etc.) and/or fuel efficiency, among other advantages (e.g., the ability to track contaminated feedstock back to its source).

Figure 1:
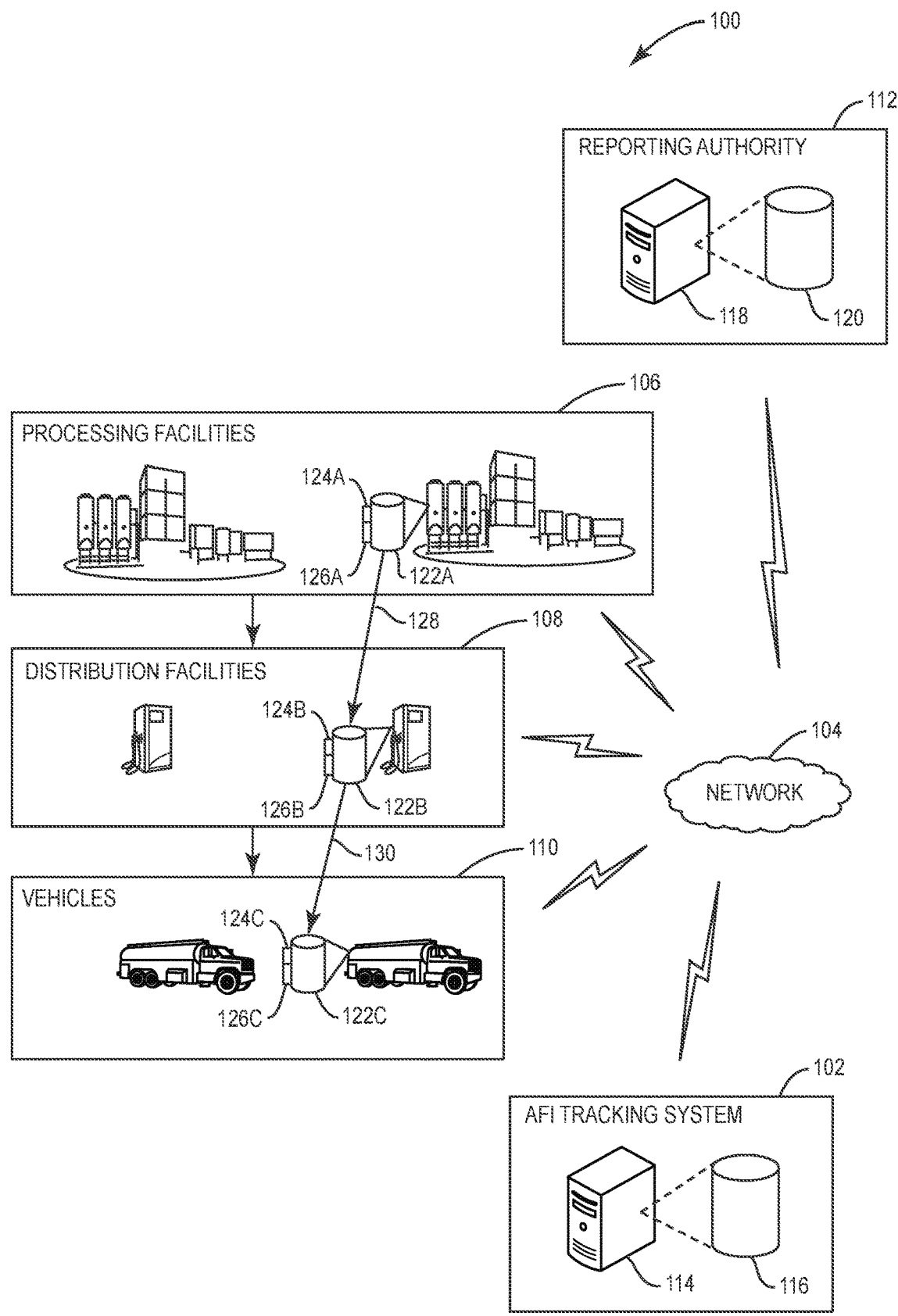
FIG. 1 is a schematic diagram of an alternative fuel life-cycle tracking system comprising an AFI tracking system in electronic communication with a plurality of processing facilities, a plurality of distribution facilities, a plurality of vehicles, and a reporting authority, according to one embodiment.

FIG. 1 is a schematic diagram of an alternative fuel life-cycle tracking system 100, according to one embodiment. The alternative fuel life-cycle tracking system 100 comprises an AFI tracking system 102 (e.g., AFI tracking engine) in electronic communication over a network 104 with a plurality of processing facilities 106, a plurality of distribution facilities 108, a plurality of vehicles 110, and a reporting authority 112. The AFI tracking system 102 comprises a server 114 (e.g., remote server) and a database 116, and the reporting authority 112 comprises a server 118 and a database 120. The AFI tracking system 102 tracks alternative fuel from production at the processing facilities 106 through the distribution facilities 108 to consumption by the vehicles 110. In other words, the AFI tracking system 102 tracks alternative fuel components through the fuel lifecycle for accounting and validation purposes with regards to fuel transfer, fuel blending, fuel consumption, and various batch properties (e.g., to determine CI content, proper RIN accountability, etc.). This allows the AFI tracking system 102 to validate fuel life-cycle for proof with regards to regulatory (e.g., federal, state, CARB, EPA, etc.) accountability, as well as to track fuel life-cycle for quality control purposes (e.g., to track contaminated feedstock back to its source).

As shown, each of the processing facilities 106, distribution facilities 108, and vehicles 110 comprise at least one container storing alternative fuel (e.g., renewable fuel, biofuel, biodiesel, etc.) therein. The method comprises electronically receiving, at the remote server 114, first alternative fuel data of a first alternative fuel in a first container 122A. The first alternative fuel (e.g., renewable fuel, biofuel, biodiesel, etc.) comprises a storage volume comprising a first batch and a second batch. The first alternative fuel data comprises a first set of AFIs associated with a first volumetric unit of the first batch and a second set of AFIs associated with a second volumetric unit of the second batch. The method further comprises electronically receiving, at the remote server 114, a transfer volume (e.g., a subset of the storage volume) of the first alternative fuel being transferred to a second container 122B. The method further comprises automatically electronically transferring, at the remote server 114, a first subset of the first set of AFIs to be electronically associated with the second container 122B and a second subset of the second set of AFIs to be electronically associated with the second container 122B. The transfer of the first subset and second subset is based on the transfer volume, and is also based on a first volumetric proportion of the first volumetric unit (of the first batch) to the second volumetric unit (of the second batch).

The AFI tracking system 102 allows for tracking feedstock of an alternative fuel (e.g., U.S. crop based fuel) for use with carbon reduction initiatives, such as state sponsored programs (e.g., LCFS). The AFI tracking system 102 allows for tracking and validating of location based production, transfer, and/or consumption, thereby allowing carbon reduction programs (e.g., LCFS) to verify credits used within geographic boundaries (e.g., within state borders and/or cities, etc.). Such location based information may be gathered through GPS devices, and may provide location information directed to where alternative fuel was produced, grown, mixed, gathered, consumed, transferred, spilled, lost, etc. Further, the AFI tracking system 102 (e.g., using an Internal Combustion Engine (ICE)) determines cost effective feedstock(s) for fuel purchase based on current and possible future conditions, such as RIN requirements, carbon credit requirements, agricultural conditions (e.g., drought, hurricane, etc.), etc. The alternative fuel makeup (e.g., $CO_2$ and feedstock information) can be determined using one or more types of fuel sensors. Other methods may include use of a fuel additive to specify the fuel makeup, wherein a fuel sensor may detect and determine the fuel additive to validate the alternative fuel. Additional sensors may also be deployed with regards to fuel types and feedstocks present, as well as other chemical property identification, for higher accuracy in determining carbon index ($CO_2$) and fuel types consumed.

The AFI tracking system 102 tracks AFIs associated with a predefined volumetric unit (e.g., amount, volume, etc.) of alternative fuel. An AFI is used to uniquely identify predefined volumetric units of alternative fuel and/or batches (e.g., gallons of alternative fuel), and may embody one or more types of identifiers consistent with governmental programs. For example, AFIs may embody RINs and/or CI credits. In this way, the AFI tracking system 102 captures AFIs from one or more reporting authorities 112. For example, the AFI tracking system 102 may capture RINs from EMTSS (an EPA moderate transaction system) and/or the LCFS CI value at the time of fuel purchase (from the PTD issued by the processing facility).

As explained above, a RIN is a type of AFI (e.g., a 36 digit number comprising multiple fields) assigned to a particular volumetric unit of renewable fuel for compliance with the EPA Renewable Fuel Standard (RFS) program. In particular, the RIN is used to track and validate fuel consumption (e.g., in-vehicle consumption) and origin of production (e.g., source). The assigned RIN is a 36-digit number comprising multiple fields, and remains with the renewable fuel until combusted or otherwise consumed. Once the fuel is blended and/or consumed, the RIN is "detached" and can then become available for sale and, once posted for sale, retired. As defined in the regulation "[E]ach generated batch-RIN will continue to uniquely identify not only a specific batch of renewable fuel, but also every gallon-RIN assigned to that batch. Thus the RIN will continue to be defined as follows:

RIN: KYYYYCCCCFFFFFBBBBBRRDSSSSSSS-SEEEEEEEE

Where:
K=Code distinguishing assigned RINs from separated RINs
YYYY=Calendar year of production or import
CCCC=Company ID
FFFFF=Facility ID
BBBBB=Batch number
RR=Code identifying the Equivalence Value
D=Code identifying the renewable fuel category
SSSSSSSS=Start of RIN block
EEEEEEEE=End of RIN block The first digit of the RIN, whose field is designated using the letter "K", has the value of "1" (one) when a fungible portion is attached, and becomes "2" (two) once the fungible portion is detached upon blending. Consequently, the RIN, with K=2, continues forward with the renewable fuel until combustion.

Figures 2A, 2B:
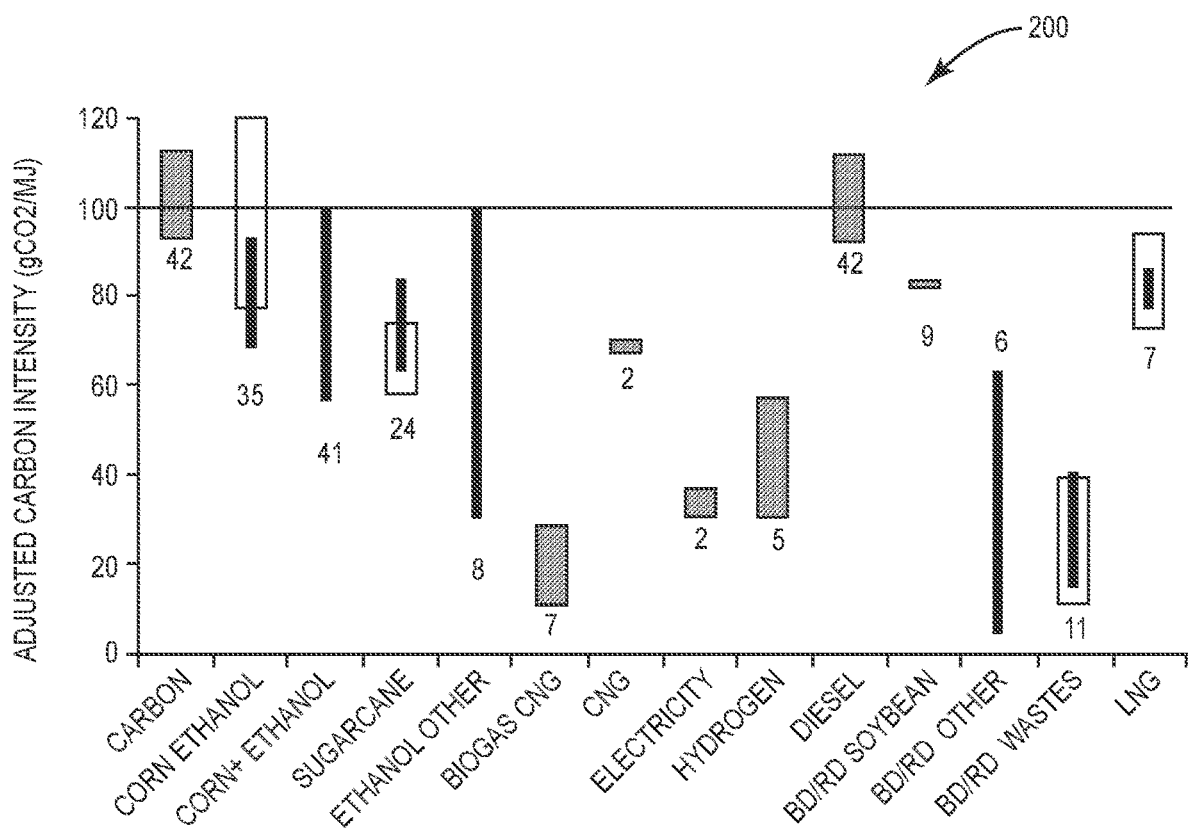
FIG. 2A is a chart illustrating the carbon intensity (CI) values for various alternative fuels compared to fossil based diesel fuel, according to one embodiment.
FIG. 2B is a chart illustrating different feedstock types and corresponding CI (well-to-wheel), indirect land use change, and total CI, according to one embodiment.

Additionally, or alternatively, the AFI may embody other unique identifiers associated with other environmental programs. In this way, the AFI may also include CI credits. The CI credits under the LCFS program can create an additional, or alternative, revenue stream for consumers of alternative fuel (e.g., qualified biodiesel, etc.). Emission intensity is a measure of the average emission rate of a given pollutant from a given source relative to the intensity of a specific activity. More specifically, carbon intensity is a measure of grams of carbon dioxide equivalent released per megajoule of energy produced (e.g., $gCO_2e/MJ$). Crop feedstock emission values (e.g., CI value, $CO_2$ value, etc.) may vary based on type. FIG. 2A is a chart 200 illustrating the CI values for various feedstock based alternative fuels (e.g., carbon, corn ethanol, corn and ethanol, sugarcane, ethanol other, biogas compressed natural gas (CNG), CNG, electricity, hydrogen, BD/RD (biodiesel/renewable diesel) soybean, BD/RD other, BD/RD wastes, and liquefied natural gas (LNG)) compared to fossil based diesel fuel (e.g., with a CI of 93.76 $gCO_2e/MJ$), according to one embodiment. These CI values are used in the LCFS to determine carbon trading credits.

FIG. 2B is a chart 202 illustrating different feedstock types and corresponding carbon intensity (CI) (well-to-wheel), indirect land use change, and total CI, according to one embodiment. As used herein, the phrase "well-to-wheel" refers to the production and distribution of fuel, and allows assessment of total energy consumption (e.g., energy conversion efficiency and emissions). The table in FIG. 2B illustrates that a Corn Oil feedstock based biodiesel fuel with a CI of 4.00 would produce 89.76 credits (93.76 $gCO_2e/MJ$ for fossil based diesel fuel—4 $gCO_2e/MJ$) under the LCFS compared to a Soybean feedstock based biodiesel of 10.51 credits (93.76 $gCO_2e/MJ$ for fossil based diesel fuel—83.25 $gCO_2e/MJ$) under the LCFS on a per gallon basis. A price of $30 to $40 per ton of CO2 would allow a price of 4 to 5 cents per gallon of Soybean feedstock based biodiesel compared to 30 to 40 cents per gallon of Corn Oil feedstock based biodiesel. As shown in FIGS. 2A and 2B, the CI factor for the listed biofuels varies greatly and can impact the carbon credits received.

The AFI tracking system 102 can determine the proper feedstock fuel to use for maximum cost impact (e.g., depending on the RIN market value, carbon credits, etc.) and/or fuel effectiveness. For example, if RIN prices are low and CI credit prices are high, the AFI tracking system 102 may choose a low CI feedstock such as corn oil over a less expensive feedstock with a higher CI value (e.g., soy), $CO_2$ rating (e.g., green rating), or mixture of both. High volume consumers may also benefit from large purchases of preferred feedstock based biofuel from production facilities to negotiate lower alternative fuel costs. The AFI tracking system 102 may also take into account feedstock commodity prices (e.g., similar to orange juice futures) to determine future purchases. As discussed below, the AFI tracking system 102 may vary in fuel use depending on other metrics (e.g., fuel range).

Returning to FIG. 1, the AFI tracking system 102 allows for tracking of AFIs, producer batches, blend ratios and/or CI emissions in real time during the fuel life-cycle from production to consumption. The AFI tracking system 102 electronically receives, transmits, and maintains PTD and other information (e.g., location, time, feedstock type, percentage of batch, etc.) during various fuel life-cycle activities (e.g., transfer, blending, fueling, consumption, etc.) from various devices (e.g., storage tanks, fueling dispensers, vehicle fuel tanks, vehicle engine consumption, etc.). When alternative fuel is transferred between one or more containers 122A, 122B, 122C, the AFI tracking system 102 automatically electronically receives and/or transmits (e.g., wired or wireless) fuel transfer information (e.g., in real time) while ensuring the required forms (e.g., PTD) meet or exceed carbon reducing program (e.g., EPA/RFS) requirements. For example, the AFI tracking system 102 may automatically electronically transmit fuel transfer information to an electronic fuel monitoring device (discussed in FIG. 4 below) and/or electronic communication devices (discussed below) at each of a plurality of containers. Fuel transfer information may include one or more fuel batch number(s), feedstock type(s) used for $CO_2$ emissions, and/or AFI management (e.g., produced, blended, consumed, retired, etc.) in accordance with carbon reduction based programs (e.g., the RFS mandates). Further, fuel transfer information may include the location and/or time fuel was consumed, blended, and/or transferred. The AFI tracking system 102 may track when the fuel was blended, whether it was used as neat (pure B100), the location where blend occurred, the location of consumption and associated CI emissions on a per AFI basis, etc.

Various electronic means for communication of fuel properties may occur wirelessly or wired, manually or automatic, and may be maintained locally (e.g., by electronic fuel transfer monitoring devices (discussed in FIG. 4 below) and/or electronic communication devices (discussed below) at each of a plurality of containers) and/or remotely (Cloud and/or remote server) or a combination of both, such as when a container (e.g., containment point, storage tank, etc.) is encountered. Electronic transfer of containment activities to the AFI tracking system 102 may also include digital signatures and or encryption of the alternative fuel information. Reconciliation of items may be transferred in their original form or tokenized by information systems remote and/or resident on each tank (e.g., container) or vehicle involved during the fuel's lifecycle or remotely via cloud and/or remote servers.

As shown in FIG. 1, the processing facilities 106 produce alternative fuel batches stored in the first container 122A. Each alternative fuel batch comprises one or more alternative fuel feedstocks (e.g., soy oil, used cooking oil cooked, used cooking oil, used cooking oil cooked mid-west produced, used cooking oil mid-west produced, canola oil, corn oil, animal fat, tallow, etc.). The first container 122A comprises a first electronic communication device 124A and/or a first sensor 126A. The first sensor 126A monitors and/or measures one or more feedstocks added to the alternative fuel batch within the first container 122A. The sensor information can then be electronically transmitted to the reporting authority 112 and/or AFI tracking system 102 over the network 104. In particular, the processing facilities 106 (e.g., producers) electronically transmit processing facility production information (including PTD information and/or other information) from the first electronic communication device 124A over the network 104 to the reporting authority 112 and/or AFI tracking system 102. The processing facility information could include producer identification, batch information, PTD items, feedstock percentages per batch, location and date of alternative fuel production, total volume (e.g., gallons) produced, total AFI range, and/or other accounting items (e.g., as may be needed to accommodate appropriate recording for accurate tracking), etc. The reporting authority server 118 assigns AFIs (e.g., RINs) based on the feedstock types within the alternative fuel batch, based on the proportions of the different feedstock types within the alternative fuel batch, based on the total volume of the alternative fuel batch, etc. The AFI tracking system 102 may electronically pull the processing facility information (e.g., PTD information) and/or other relevant information from the reporting authority 112. Alternatively, the processing facilities 106 could electronically transmit such information to the reporting authority database 120, the AFI tracking system database 116, and/or the electronic fuel monitoring devices 124A-124C.

The alternative fuel batches are then transferred from one or more of the processing facilities 106 (e.g., from the first container) to one or more of the distribution facilities 108 (e.g., to a second container). The distribution facilities 108 may further process the alternative fuel batches and/or blend multiple alternative fuel batches together to form alternative fuel. In other words, alternative fuel could comprise a first batch of a first set of feedstocks, and a second batch of a second set of feedstocks, wherein the first and second sets of feedstocks may or may not overlap (e.g., partially or completely). As shown, the alternative fuel batch within the first container 122A of the processing facilities 106 is transferred (e.g., through an alternative fuel batch transfer 128) to a second container 122B of the distribution facilities 108. The second container 122B comprises a second electronic communications device 124B and/or a second sensor 126B. The first container 122A and/or second container 122B can coordinate with the AFI tracking system 102 to automatically sync AFI transfer information (without manual input). For example, temporal, location, and/or flow volume data of the first sensor 126A and second sensor 126B can be used to confirm and validate fuel transfer for transfer of AFIs (by the AFI tracking system 102) associated with the first container 122A to the second container 122B.

During the alternative fuel batch transfer 128, the distribution facilities 108 (e.g., depot storage, fueling depot facility, etc.) request the processing facility production information and/or PTD information (e.g., from the reporting authority 112). For example, the processing facilities 106, distribution facilities 108, and/or transport (not shown) may electronically request the associated feedstock type and percentage for the amount (e.g., gallons) of alternative fuel transferred from the processing facilities 106 to the distribution facilities 108. The processing facilities 106 and/or distribution facilities 108 may automatically electronically transmit distribution transfer information (including PTD information and/or other information) to the AFI tracking system 102 and/or reporting authority 112 from the first electronic communication device 124A or second electronic communication device 124B over the network 104 to the reporting authority 112 and/or AFI tracking system 102. For example, the distribution transfer information may include all of the processing facility production information and/or may also include the location of transfer, gallons transferred, AFI values transferred, vehicle or storage tank ID (e.g., VIN), and/or time and date of transfer, etc.

The AFI tracking system database 116 then transfers the AFIs associated with the processing facilities 106 and the first container 122A to the distribution facilities 108 and the second container 122B. The number of AFIs transferred depends on the amount (e.g., gallons) of alternative fuel batches transferred. Further, the number of AFIs transferred includes distribution facility information (e.g., address, container number, etc.). This could include multiple transfers to various locations. The distribution facilities may then further process and/or blend the alternative fuel batches.

The alternative fuel contained within the second container 122B is then transferred from one or more of the distribution facilities 108 to one or more vehicles 110 (e.g., to a third container 122C). The third container 122C comprises a third electronic communications device 124C and/or a third sensor 126C. The second container 122B and/or third container 122C can coordinate with the AFI tracking system 102 to automatically sync AFI transfer information without manual input. For example, temporal and/or flow volume data of the second sensor 126B and third sensor 126C can be used to transfer AFIs associated with the second container 122B to the third container 122C.

During the alternative fuel transfer 130, the vehicles 110 request the processing facility production information, distribution facility transfer information, and/or PTD information (e.g., from the reporting authority 112). For example, the distribution facilities 108 and/or vehicles 110 may electronically request the associated feedstock type and percentage for the amount (e.g., gallons) of alternative fuel transferred from the processing facilities 106 to the distribution facilities 108. The distribution facilities 108 and/or vehicles 110 may automatically electronically transmit to the AFI tracking system 102 and/or reporting authority 112 vehicle transfer information (including PTD information and/or other information) from the second electronic communication device 124B and/or third electronic communication device 124C over the network 104 to the reporting authority 112 and/or the AFI tracking system 102. For example, the vehicle transfer information may include all of the processing facility production information, distribution transfer information, and/or may also include VIN, location of transfer, volume transferred (e.g., gallons transferred), and/or AFIs transferred, etc. The AFI tracking system database 116 may then automatically transfer the AFIs associated with the processing facilities 106 and the first container 122A to the vehicles 110 and the third container 122C. The number of AFIs transferred depends on the amount (e.g., gallons) of alternative fuel transferred.

The AFI tracking system 102 further tracks the alternative fuel as it is consumed by the vehicles 110 (explained below with respect to FIG. 5). In other words, the AFI tracking system 102 tracks the alternative fuel as the alternative fuel is blended and/or consumed. In particular, the vehicles 110 may blend multiple types of alternative fuel and/or blend alternative fuel with fossil fuel. The AFI tracking system 102 automatically tracks fuel consumption and related vehicle consumption information, such as whether the alternative fuel was consumed blended or pure, the location of volumetric unit consumed (e.g., using GPS), and/or the $CO_2$ value of AFI, etc. The vehicles 110 may then electronically store and record transferred AFIs (e.g., RINs and CI) such that they can be tracked by the fleet or engine manufacture (e.g., down to the individual engine). The operating vehicles 110 blend renewable fuel with fossil fuel (e.g., diesel) and upload the extracted AFIs (e.g., RINs), blend ratio, date, time, and/or location, etc. to the AFI tracking system 102 (e.g., in real time or scheduled for later upload). The AFI tracking system 102 then sells the AFIs (e.g., RINs and/or LCFS carbon credits), and electronically notifies the regulatory authority (e.g., EMTS and/or LCFS) of the sale and retired AFIs (e.g., RINs and/or LCFS carbon credits).

Figure 3:
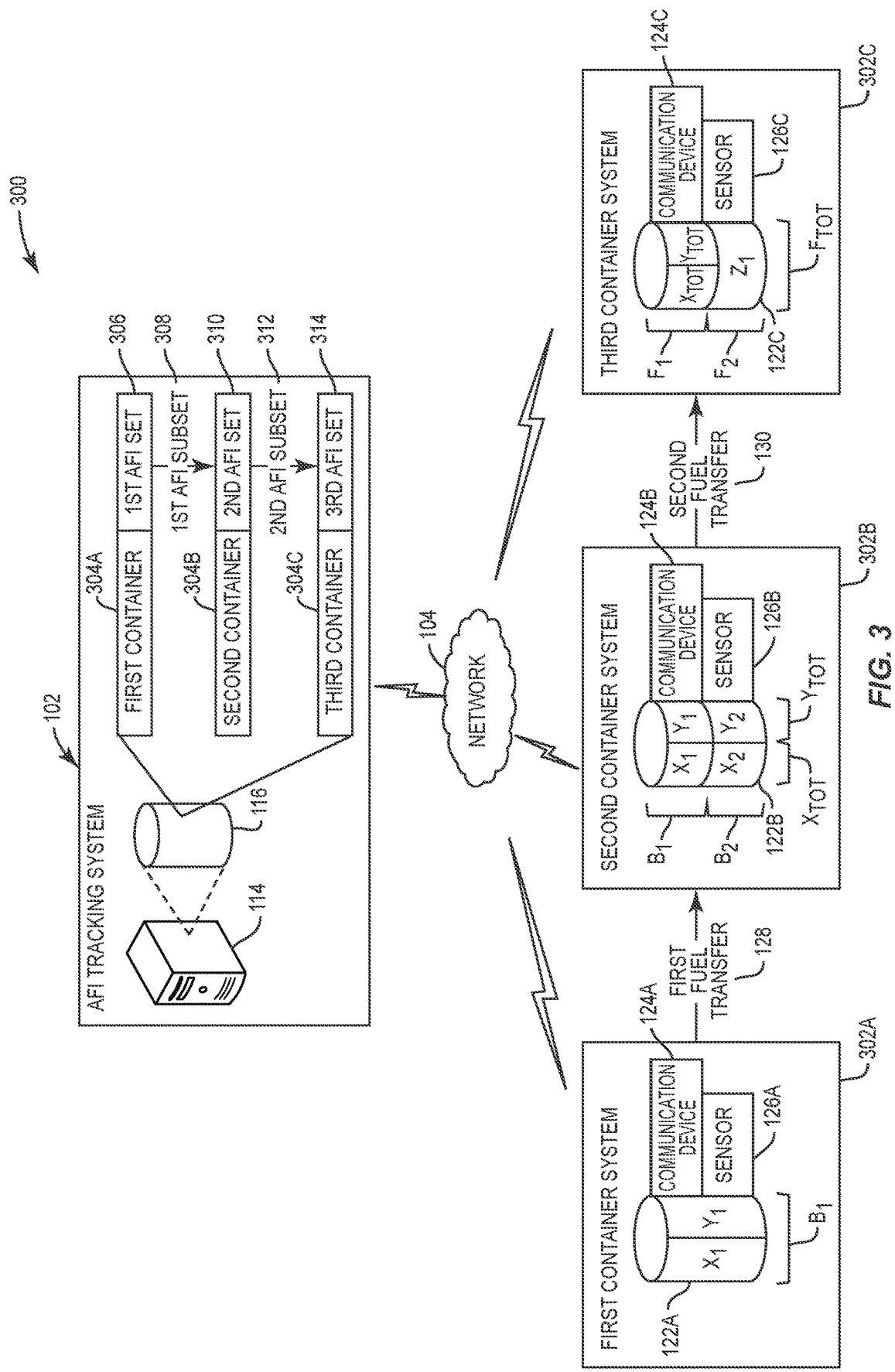
FIG. 3 is a schematic diagram of the AFI tracking system of FIG. 1, illustrating transfer of AFI subsets associated with a container of a plurality of containers as fuel is transferred between containers of the plurality of containers, according to one embodiment.
Figure 5:
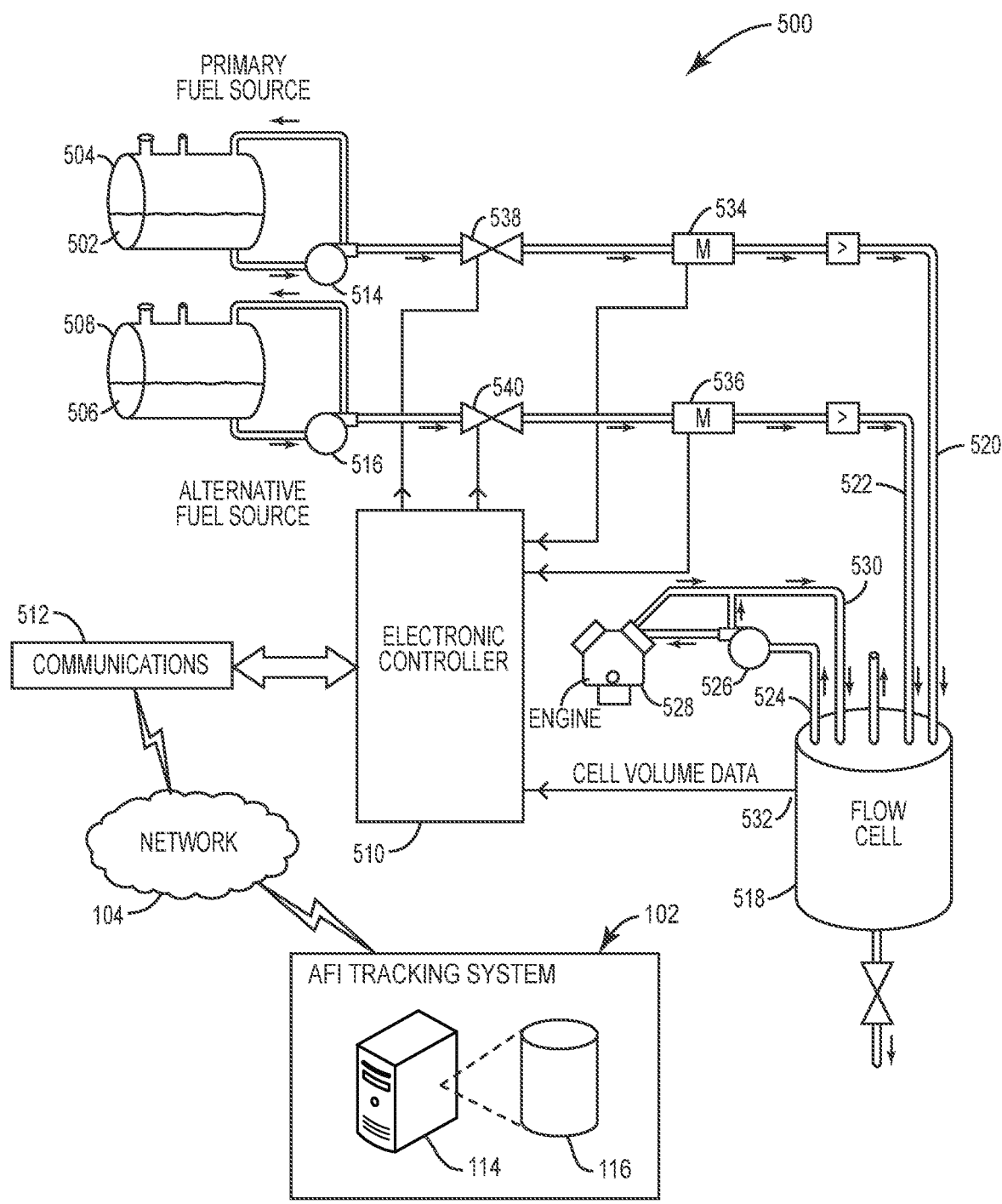
FIG. 5 is a schematic diagram of a blending system of a vehicle of the plurality of vehicles of FIG. 1 in electronic communication with the AFI tracking system of FIGS. 1 and 3, wherein the blending system ascertains a volume of primary and alternative fuel consumed via metrics obtained (e.g., from primary and alternative fuel reservoirs, via metrics obtained at a flow cell, by metering devices, etc.), according to one embodiment.

FIG. 3 is a schematic diagram 300 of the AFI tracking system 102 of FIGS. 1 and 5 illustrating transfer of AFI subsets associated with a container of a plurality of containers as fuel is transferred between containers of the plurality of containers, according to one embodiment. In particular, the diagram 300 illustrates a first container system 302A (comprising the first container 122A, the first electronic communication device 124A, and the first sensor 126A), a second container system 302B (comprising the second container 122B, the second electronic communication device 124B, and the second sensor 126B), and a third container system 302C (comprising the third container 122C, the third electronic communication device 124C, and the third sensor 126C).

As shown, the first container 122A comprises a first feedstock first amount $X_1$ and a second feedstock first amount $Y_1$ in a first batch $B_1$. The AFI tracking system 102 electronically identifies a first container 304A and associates with it a first AFI set 306. The first AFI set 306 comprises a range of AFIs associated with the first feedstock first amount $X_1$ and the second feedstock first amount $Y_1$.

During a first fuel transfer 128 (e.g., "alternative fuel batch transfer"), the first batch $B_1$ is transferred to the second container 122B, which already contains a second batch $B_2$ comprising a first feedstock second amount $X_2$ and a second feedstock second amount $Y_2$. First sensor 126A and/or second sensor 126B may measure the volume of fuel transferred and the first electronic communication device 124A and/or second electronic communication device 124B may communicate first transfer information to the AFI tracking system 102. As shown, the entirety of the first batch $B_1$ is transferred to the second container 122B. However, only a portion may be transferred instead. As a result of the first fuel transfer 128, the AFI tracking system 102 transfers within its database 116 a first AFI subset 308 from the first container 304A to a second container 304B. In this case the first AFI subset 308 is the entirety of the first AFI set 306 because the entirety of the first batch $B_1$ was transferred to the second container 122B. However, if only a portion of the first batch $B_1$ was transferred, then only a portion of the first AFI set 306 would be transferred. In such circumstances, the portion of AFIs associated with the first feedstock first amount $X_1$ and AFIs associated with the second feedstock first amount $Y_1$ would be proportional to the ratio of the first feedstock first amount $X_1$ to the second feedstock first amount $Y_1$.

Once transferred, the first feedstock first amount $X_1$ and first feedstock second amount $X_2$ create a first feedstock total amount $X_{TOT}$. The second feedstock first amount $Y_1$ and the second feedstock second amount $Y_2$ create a second feedstock total amount $Y_{TOT}$. Accordingly, a second AFI set 310 (e.g., consolidated second AFI set) comprises AFIs associated with the first feedstock first amount $X_1$, the first feedstock second amount $X_2$, the second feedstock first amount $Y_1$, and the second feedstock second amount $Y_2$. The totality of the first batch $B_1$ and the second batch $B_2$ create first alternative fuel $F_1$.

During a second fuel transfer 130 (e.g., "alternative fuel transfer"), the first alternative fuel $F_1$ is transferred to the third container 122C, which already contains a second alternative fuel $F_2$ comprising a third feedstock first amount $Z_1$ (different from the first and second feedstocks of the first alternative fuel $F_1$). Second sensor 126B and/or third sensor 126C may measure the volume of alternative fuel transferred and the second electronic communication device 124B and/ or third electronic communication device 124C may communicate second transfer information to the AFI tracking system 102. As shown, the entirety of the first alternative fuel $F_1$ is transferred to the third container 122C. However, only a portion may be transferred instead. As a result of the second fuel transfer 130, the AFI tracking system 102 transfers within its database 116 a second AFI subset 312 from the second container 304B to a third container 304C. In this case, the second AFI subset 312 is the entirety of the second AFI set 310 because the entirety of the first alternative fuel $F_1$ was transferred to the third container 122C. However, if only a portion of the first alternative fuel $F_1$ was transferred, then only a portion of the second AFI set 310 would be transferred. In such circumstances, the portion of AFIs associated with the first feedstock total amount $X_{TOT}$ and AFIs associated with the second feedstock total amount $Y_{TOT}$ would be proportional to the ratio of the first feedstock total amount $X_{TOT}$ to the second feedstock total amount $Y_{TOT}$.

Once transferred, the first alternative fuel $F_1$ and the second alternative fuel $F_2$ create a total alternative fuel $F_{TOT}$. Accordingly, a third AFI set 314 (e.g., consolidated third AFI set) comprises AFIs associated with the first feedstock first amount $X_1$, the first feedstock second amount $X_2$, the second feedstock first amount $Y_1$, the second feedstock second amount $Y_2$, and the third feedstock first amount $Z_1$.

Transfer and/or consumption of the second alternative fuel $F_2$ would result in proportional transfer and/or detachment of AFIs based on the proportions of the different types and amounts within the total alternative fuel $F_{TOT}$ (and based on a consumed volume of the second alternative fuel $F_2$). For example, if the third feedstock first amount $Z_1$ is twice as large as each of the first feedstock total amount $X_{TOT}$ and the second feedstock total amount $Y_{TOT}$, then AFIs associated with the third feedstock first amount $Z_1$ would detach twice as fast as those associated with the first feedstock total amount $X_{TOT}$ and the second feedstock total amount $Y_{TOT}$. In this way, the AFI tracking system 102 is able to track feedstock within the alternative fuel lifecycle (e.g., from production to consumption).

It is noted that different alternative fuels may have different AFI densities, such as depending on the CI of the respective feedstock and batches within the alternative fuels. As an example, assume an alternative fuel with two batches. The first batch comprises 50% of soy oil (CI 83.25), and 50% of Corn oil (CI 4). The second batch comprises 20% of the soy oil, 40% of used cooking oil mid-west produced (CI 13.83), and 40% of corn oil. Assume sixty gallons of alternative fuel is transferred or consumed, with 10 gallons of the first batch, and 50 gallons of the second batch. In this way, each gallon of alternative fuel, on a feedstock basis, comprises 25% of soy oil, 33% of used cooking oil mid-west produced, and 42% of corn oil. Further, multiplying these percentages by the CI of the respective feedstock means that the CI per gallon is approximately 27.06.

Figure 4:
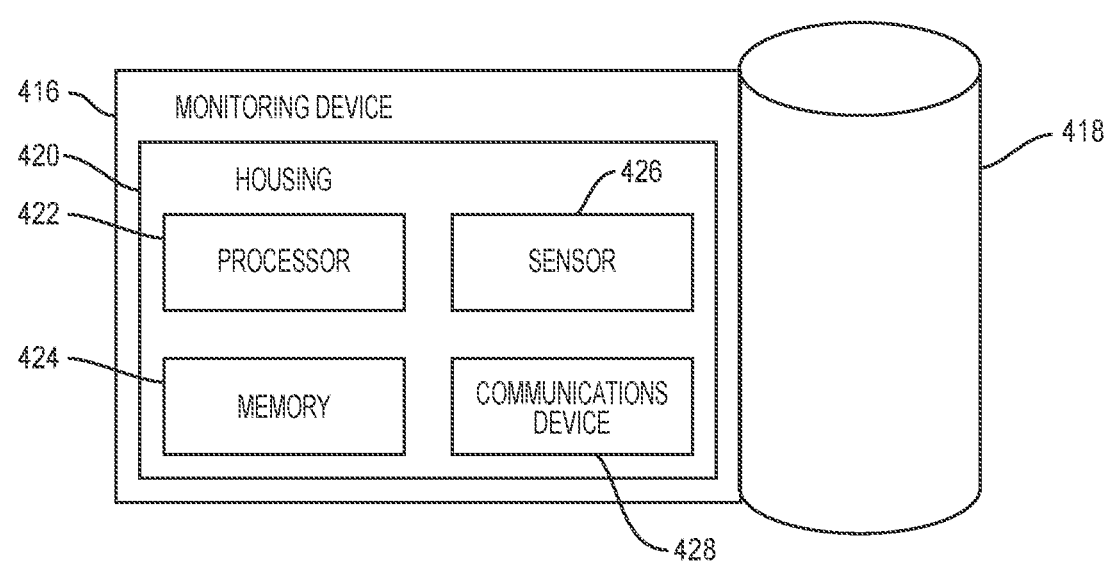
FIG. 4 is a schematic diagram of an electronic fuel transfer monitoring device which may be used with any of the containers of FIGS. 1 and 3, according to one embodiment.

FIG. 4 is a schematic diagram of an electronic fuel transfer monitoring device 416 which may be used with any of the containers of FIGS. 1 and 3, according to one embodiment. More specifically, the electronic fuel transfer monitoring device 416 is in mechanical communication with a container 418. The electronic fuel transfer monitoring device 416 comprises a housing 420 with a processor 422, memory 424, sensor 426, and/or communications device 428 positioned within the housing 420 (although one or more of such components could be positioned external to the housing 420). The sensor 426 may be configured to detect flow of alternative fuel into and/or out of the container 418, and to measure flow volume of the alternative fuel. The sensor 426 may also be configured to detect and identify different types of alternative fuels, different types of feedstock within an alternative fuel, and/or different types of batches within an alternative fuel. The communications device 428 can transmit and/or receive relevant transfer information from or to the AFI tracking system 102 (shown in FIGS. 1, 3, and 5). Additionally, or alternatively, the electronic fuel transfer monitoring device 416 may locally store and/or track AFIs flowing into and/or out of the container 418 and perform at least some of the functionality described above (e.g., with respect to the server 116).

In this way, the AFI tracking system 102 allows for the electronic proportional tracking of AFIs (in real time) and proportional release of AFIs associated with alternative fuel. The AFI tracking system 102 can be automated to streamline reporting efforts, increase reporting accuracy, and decrease fraud. It also allows for real-time tracking, and more accurate release of AFIs, among other advantages (e.g., the ability to track contaminated feedstock back to its source). As discussed below, the AFI tracking system 102 may include a blending system for a vehicle 110 to track fuel blending and/or consumption by the vehicle 110. This also provides the ability to choose fuel consumption for a vehicle 110 to maximize cost efficiency (e.g., based on governmental incentives, etc.) and/or fuel efficiency, etc.

FIG. 5 is a schematic diagram of a blending system 500 of a vehicle of the plurality of vehicles 110 of FIG. 1 in electronic communication with the AFI tracking system 102 of FIG. 1, according to one embodiment. The blending system 500 ascertains the volume of primary fuel 502 and alternative fuel 506 consumed via metrics obtained. As discussed above, the emission offset capability (e.g., CI, $CO_2$, etc.) of alternative fuels differs, and various regional and geographic jurisdictions may offer credits and/or other financial incentives (rendering such emission offsets fungible). Accordingly, the blending system 500 (e.g., fuel control system) of a vehicle 110 is configured to select one or more alternative fuels and/or blend amounts within the vehicle 110 to maximize fuel cost effectiveness (e.g., maximize credits and/or financial incentives). In other words, the system dynamically and automatically suspends, selects, and/or re-selects alternative fuels and/or AFI assignments. At the end of the life-cycle process, the resulting vehicle consumption information (e.g., amount of fuel consumed, batch information of fuel consumed, feedstock information of fuel consumed, time of consumption, date of consumption, and/or location of consumption, etc.) can then be automatically electronically transmitted to the reporting authority 112 (shown in FIG. 1). For example, the vehicle consumption information can be automatically electronically transmitted to the EPA EMTS system in the format described by the EPA website (www.epa.gov/otaq/fuels/rfsdata/2012emts.htm) and/or other agencies such as CARB by the AFI tracking system 102. Such transmission may include digital signatures for validation and confirmation purposes thereby assuring proper compliance.

In this regard, FIG. 5 shows a blending system 500 for use in providing fuel to an internal combustion engine in accordance with one embodiment of the present disclosure. The fuel used by the engine may be the primary fuel 502 contained in a primary fuel source 504 (e.g., first fuel source, first vehicle container), the alternative fuel 506 contained in a alternative fuel source 508 (e.g., second fuel source, second vehicle container), or, as will be described in more detail below, any combination of the primary fuel 502 and the alternative fuel 506. Primary fuel source 504 and alternative fuel source 508 may also include features common to fuel storage reservoirs.

The blending system 500 includes an electronic controller 510 that (by internal algorithm and/or external command) effects control of some elements of the blending system 500, receives signals from other elements of the blending system 500, and is further capable of recording data into memory for later transmission or retrieval. The electronic controller 510 also includes a communications interface 512 capable of communications and external interfacing. In particular, the communications interface 512 electronically communicates with the AFI tracking system 102 over the network 104. The electronics controller 510 may be self-contained, distributed, or function as a sub-element of a larger electronic controller. More specifics of the electronic controller 510 will be enumerated later as it interacts with various elements of blending system 500.

The blending system 500 also includes a primary fuel pump 514 whose inlet is sourced from the primary fuel source 504 supply outlet via fuel transmission line. The blending system 500 also includes an alternative fuel pump 516 whose inlet is sourced from the primary fuel source 504 supply outlet via fuel transmission line. As will be discussed in more detail later, the blending system 500 also includes a flow cell 518. The flow cell 518 contains a volume, and the volume therein is sourced by a primary fuel inlet line 520 and alternative fuel inlet line 522, whereupon any fuel sourced by inlet lines 520, 522 is allowed to intermix within said volume.

The flow cell 518 also includes a fuel outlet line 524 serving as a fuel source for an engine 528, specifically the engine fuel control system. In this embodiment, the fuel outlet line 524 serves as a fuel source by sourcing an engine fuel pump inlet 526. To allow for the acceptance of prior mixed fuel as may have occurred within the volume of the flow cell 518 that has not been combusted within engine 528 and instead returned as bypass, the flow cell 518 also includes bypass fuel return line 530. As a result, the flow cell 518 is rendered capable of re-accepting prior mixed fuel into said flow cell volume. The flow cell 518 also includes at least one sensor indicating liquid volume contained therein and/or volume rate of change, represented by cell volume data signal lines 532, which transmit this data to electronic controller 510 such that electronic controller 510 may, by controlling valves, maintain a sufficient volume of fuel within flow cell 518 for both instantaneous and sustained engine demand.

The blending system 500 further includes a primary fuel volume measurement device 534 in fluidic communication with the primary fuel source 504. The function of the primary fuel volume measurement device 534 is to measure the volume of primary fuel 502 as communicated to electronic controller 510. The primary fuel volume measurement device 534 may use any device suitable for direct or inferential volume measurement, including but not limited to float, Archimedes principal, mass of fuel, or tare mass of fuel and storage vessel combined. The primary fuel volume measurement device 534 may be continuous in its measurement, or quantized. The primary fuel volume measurement device 534 may also provide linear and/or digital output.

Similarly, an alternative fuel volume measurement device 536 is in fluidic communication with the alternative fuel source 508. The function of the alternative fuel measurement device 536 is to measure the volume of alternative fuel 506 as communicated to electronic controller 510. The alternative fuel volume measurement device 536 may use any device suitable for direct or inferential volume measurement, including but not limited to float, Archimedes principal, mass of fuel, or tare mass of fuel and storage vessel combined. The alternative fuel volume measurement device 536 may be continuous in its measurement, or quantized. The alternative fuel volume measurement device 536 may also provide linear and/or digital output.

Volume measurement devices 534, 536 may be of a broad construct of possible metering devices including but not limited to those creating a positive displacement in nature such as a piston, screw, roots or gear, and/or metering devices inferential in nature such as a turbine, pressure differential, thermal, or stagnation against an element. Furthermore, while volume measurement is being sought, there is nothing to prevent the utilization of metering devices that instead measure flow rate by nature, said flow rate being converted into volume by the inclusion of time by electronic controller 510, or by the metering device itself.

Volume measurement devices 534, 536 may be made capable of accepting calibration to defined or prescribed standards, or may be of such fixed or stable nature by construct such that their characteristics may be classified against defined or prescribed standards. Furthermore, the electronic controller 510 may be made programmable to accept said calibration and/or characteristic data pertaining to the volume measurement devices 534, 536, and therefore able to include said calibration and/or characteristic data within internal calculations to establish a known and verifiable accuracy in compliance with defined or prescribed standards.

Volume measurement devices 534, 536 may be of such construct as to be sealed once calibrated and/or characterized. The electronic controller 510 may be of such construct as to be sealed once programmed with calibration and/or characterization data. The electronic controller 510 and/or volume measurement devices 534, 536 may further be of such construct as to resist tampering, display evidence of tampering, or cease function and/or signal occurrence if tampered.

Within blending system 500, the electronic controller 510 utilizes volume data derived from primary fuel volume measurement device 534 and alternative fuel volume measurement device 536 to perform both blending of primary fuel 502 and alternative fuel 506 according to a desired ratio, and also extraction of one or more AFIs (e.g., RINs) and/or determination of other financial incentives, such as tax credits and/or subsidies, as allowed and as applicable. Blend ratios enforced by the electronic controller 510 may be based on what is the most cost effective (i.e. lowest cost) fuel to be consumed by the engine 528 and/or what is the most energy efficient (e.g., provides largest geographical range) fuel to be consumed by the engine 528. For example, it may be more cost effective to use alternative fuel 506 based on not only the cost of the alternative fuel 506, but any financial incentives that may be available for use of alternative fuel 506. Primary fuel 502 may still be blended with the alternative fuel 506 if required to receive such financial incentives. Alternatively, primary fuel 502 may be more cost effective to run the engine 528 even in light of the financial incentives. Certain jurisdictions may still require use of some alternative fuel 506 along with primary fuel 502 even if the primary fuel 502 is most cost effective. In summary, the electronic controller 510 can perform these calculations and enforce the desired blend ratio according to these parameters.

If AFIs are available for use of the alternative fuel 506, the electronic controller 510 may receive AFI information regarding the alternative fuel 506 delivered to the alternative fuel source 508 in the form of one or more AFIs if the AFIs have not been previously extracted. Such communication may be wired or wireless, and may come from the AFI tracking system 102. A separate AFI may be available for each increment of alternative fuel delivered, such as for every gallon. The electronic controller 510 may control delivery of the primary and/or alternative fuel based on the RIN information. For example, if the AFIs have already been extracted, the electronic controller 510 may operate in "neat" mode such that no blending of the primary fuel 502 and alternative fuel 506 is performed. Only primary or alternative fuel would be delivered to the flow cell 518. If AFIs have not been extracted, AFI-based incentives may be available for blending alternative fuel 506 with primary fuel 502 for use by the engine 528. The RINs would be extracted by the electronic controller 510 as blending occurs.

As an example, if the usable volume within flow cell 518 is designed to be 100 milliliters and a blend ratio of 30 percent primary fuel and 70 percent alternative fuel is desired, the electronic controller 510 would establish flow of primary fuel 502 by enabling a valve 538 until the volume measurement device 534 indicated 30 milliliters had been dispensed into flow cell 518, at which time the valve 538 would be disabled. Similarly, the electronic controller 510 would establish flow of alternative fuel 506 by enabling a valve 540 until the volume measurement device 536 indicated 70 milliliters had been dispensed into flow cell 518, at which time the valve 540 would be disabled. As fuel is consumed by the engine 528 and the volume of blended fuel within flow cell 518 becomes depleted, at a specified threshold of depletion the above process would repeat, with the depleted volume being replaced again according to ratio. As one example, if 50 milliliters is required to replenish the fuel volume within flow cell 518, the electronic controller 510 would establish flow of primary fuel 502 by enabling the valve 538 until the volume measurement device 534 indicated 15 milliliters had been dispensed into flow cell 518, at which time the valve 538 would be disabled, and so on. Similarly, electronic controller 510 would establish flow of alternative fuel 506 by enabling the valve 540 until the volume measurement device 536 indicated 35 milliliters had been dispensed into flow cell 518, at which time the valve 540 would be disabled, and so on. Furthermore, during each blend operation, the volume of primary fuel 502 and alternative fuel 506 and the ratio at which the blend occurs may be recorded by the electronic controller 510 for later transmission or retrieval, or by predetermined time, elapsed time interval, or accumulation of data may be immediately transmitted by communication methods to an external system or communications network, wired or wireless, by the electronic controller 510, said volume and blend data being useful for extraction of AFIs and/or determination of tax credits and/or subsidies, as allowed and as applicable.

With separate volume measurement devices available, specifically volume measurement device 534 determining volume of primary fuel 502 and volume measurement device 536 determining volume of alternative fuel 506, there is nothing to preclude the electronic controller 510 from dispensing primary fuel 502 and alternative fuel 506 into the flow cell 518 simultaneously, or in any sequence of partial or full dispense operations. Likewise, while the electronic controller 510 effected the blending of primary fuel 502 with alternative fuel 506 in the prior examples, there is nothing to preclude the electronic controller 510 from maintaining a reservoir volume of either primary fuel 502 or alternative fuel 506 within flow cell 518 in neat form. In this case, the electronic controller 510 would be selecting operation between primary fuel 502 or alternative fuel 506, and therefore not performing a blending function. Similarly, during neat fuel selection operation, the volume of primary fuel 502 and alternative fuel 506 may be recorded by the electronic controller 510 for later transmission or retrieval, or by predetermined time, elapsed time interval, or accumulation of data may be immediately transmitted by communication methods to an external system or communications network, wired or wireless, by the electronic controller 510, said volume and blend data (said blend being 0:100% or 100:0% in this case) being useful for extraction of AFIs and/or determination of tax credits and/or subsidies, as allowed and as applicable, and also for verification that neat utilization has in fact occurred, if and as prescribed.

Figure 6:
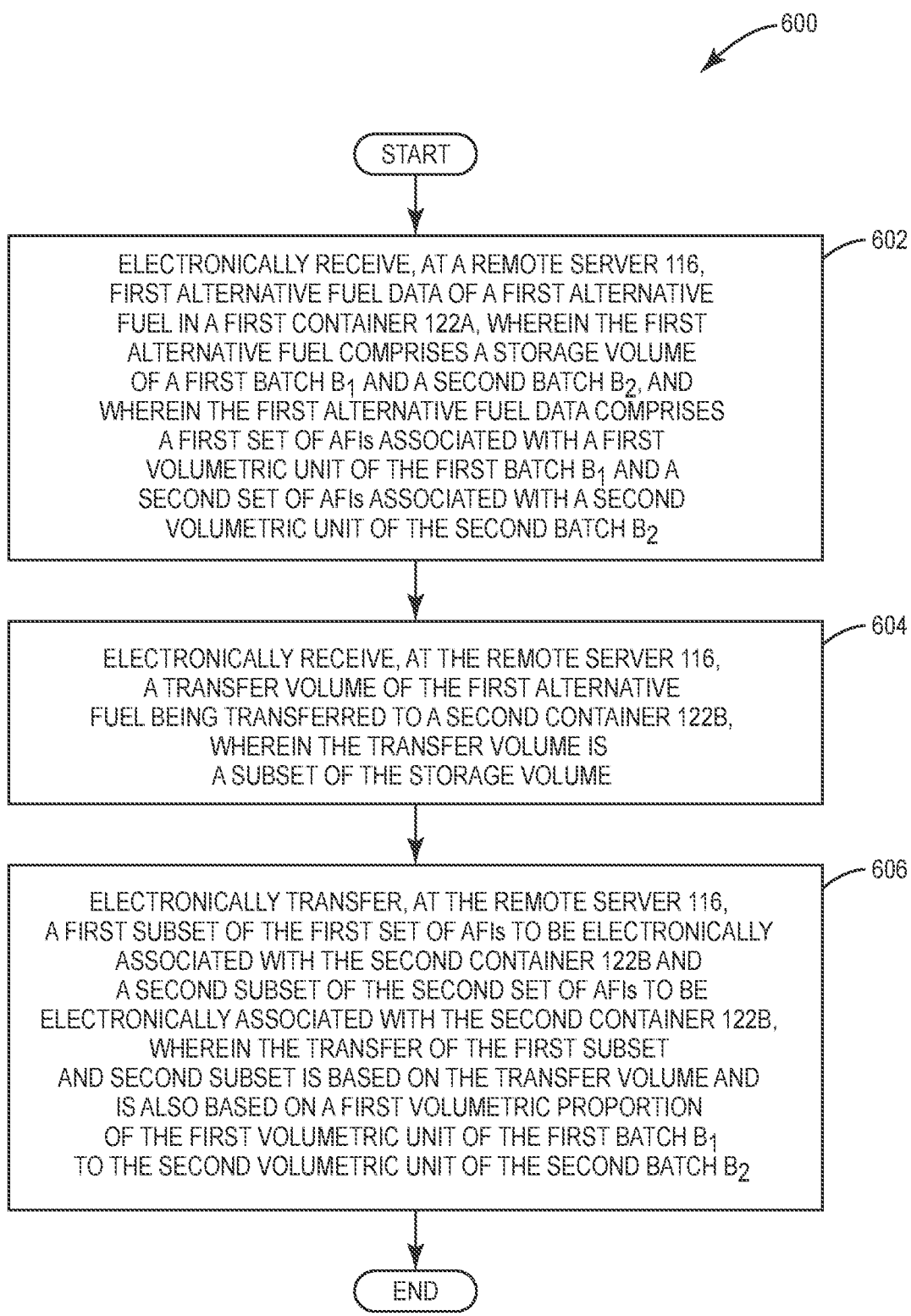
FIG. 6 is a flowchart illustrating transfer of AFI subsets by the AFI tracking system of FIGS. 1, 3 and 5 as alternative fuel is transferred between a plurality of containers, according to one embodiment.

FIG. 6 is a flowchart 600 illustrating transfer of AFI subsets by the AFI tracking system of FIGS. 1, 3 and 5 as alternative fuel is transferred between containers of a plurality of containers, according to one embodiment. As shown, in step 602, the AFI tracking system 102 (e.g., server 116) electronically receives first alternative fuel data of a first alternative fuel in a first container 122A. The first alternative fuel comprises a storage volume comprising a first batch $B_1$ and a second batch $B_2$. The first alternative fuel data comprises a first set of AFIs associated with a first volumetric unit of the first batch $B_1$ and a second set of AFIs associated with a second volumetric unit of the second batch $B_2$. In step 604, the AFI tracking system 102 (e.g., server 116) electronically receives a transfer volume of the first alternative fuel being transferred to a second container 122B, wherein the transfer volume is a subset of the storage volume. In step 606, the AFI tracking system 102 (e.g., server 116) (automatically) electronically transfers a first subset of the first set of AFIs to be electronically associated with the second container 122B and a second subset of the second set of AFIs to be electronically associated with the second container 122B. The transfer of the first subset and second subset is based on the transfer volume and is also based on a first volumetric proportion of the first volumetric unit of the first batch $B_1$ to the second volumetric unit of the second batch $B_2$.

Figure 7A:
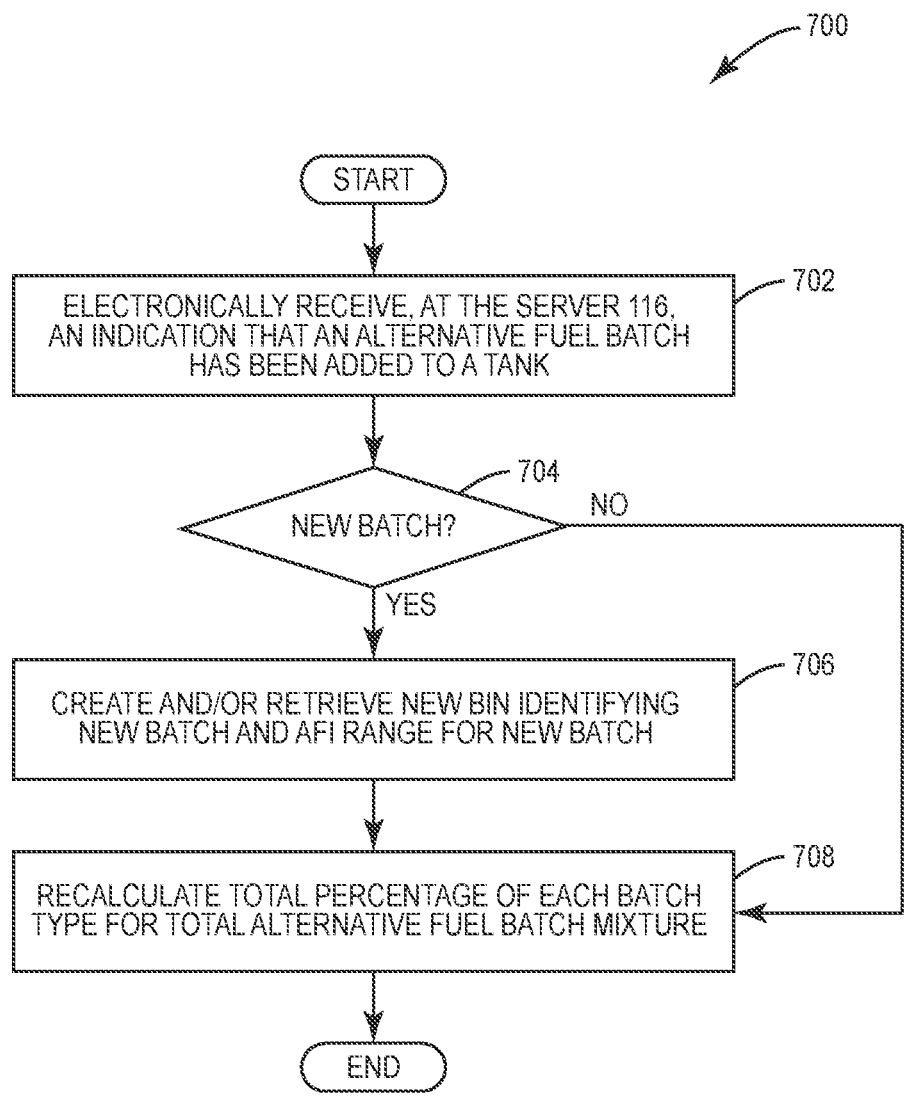
FIG. 7A is a flowchart illustrating processing by the AFI tracking system of FIGS. 1, 3 and 5 when batches of feedstock are added to a tank, according to one embodiment.

FIG. 7A is a flowchart 700 illustrating processing by the AFI tracking system of FIGS. 1, 3 and 5 when batches of feedstock are added to a tank, according to one embodiment. More specifically, in step 702, the AFI tracking system 102 (e.g., server 116) electronically receives an indication that an alternative fuel batch has been added to a tank (e.g., at a processing facility 106 or distribution facility 108). In step 704, the AFI tracking system 102 (e.g., server 116) determines whether the added alternative fuel batch is a new batch. If a positive determination is made in step 704, then in step 706, the AFI tracking system 102 electronically creates and/or retrieves a new BIN and AFI range (e.g., RIN range) for each new batch added. Then in step 708, the AFI tracking system 102 (e.g., server 116) recalculates the total percentage of each batch type in the total alternative fuel batch mixture. If a negative determination is made in step 704, then the process proceeds to step 708.

Figure 7B:
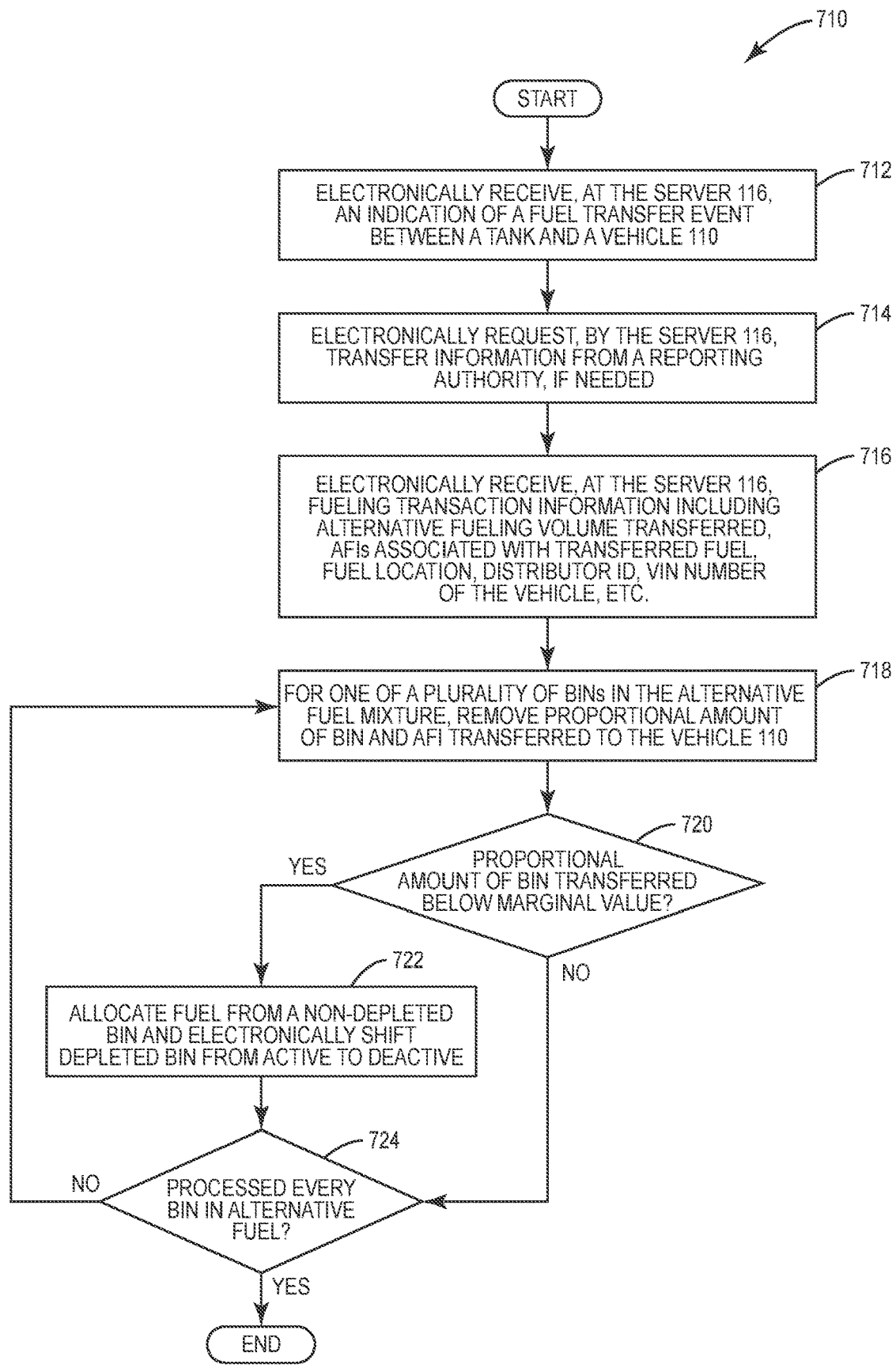
FIG. 7B is a flowchart illustrating processing by the AFI tracking system of FIGS. 1, 3 and 5 when alternative fuel is transferred from a tank to a vehicle, according to one embodiment.

FIG. 7B is a flowchart 710 illustrating processing by the AFI tracking system 102 of FIGS. 1, 3 and 5 when alternative fuel is transferred from a tank (e.g., container) to a vehicle 110, according to one embodiment. More specifically, in step 712, the AFI tracking system 102 (e.g., server 116) electronically receives an indication of a fuel transfer event between a tank (e.g., processing facility 106 or distribution facility 108) and a vehicle 110. In step 714, the AFI tracking system 102 (e.g., server 116) electronically requests transfer information from a reporting authority (e.g., EPA, LCFS, etc.), if needed. In step 716, the AFI tracking system 102 (e.g., server 116) electronically receives fueling transaction information including alternative fueling volume transferred, AFIs associated with the transferred fuel, fuel location, distributor ID, VIN number of the vehicle, etc. In step 718, the AFI tracking system 102 (e.g., server 116) electronically removes, for one of a plurality of BINs in the alternative fuel mixture, a proportional amount of BIN and AFI transferred to the vehicle 110. In step 720, the AFI tracking system 102 (e.g., server 116) electronically determines whether the proportional amount of BIN transferred is below a marginal value. If a positive determination is made, then in step 722, the AFI tracking system 102 (e.g., server 116) allocates fuel from a non-depleted BIN and electronically shifts the depleted BIN from active to deactive. Then the process proceeds to step 724. If a negative determination is made in step 720, then the process proceeds to step 724. In step 724, the AFI tracking system 102 (e.g., server 116) determines whether every BIN in the alternative fuel has been processed. If a negative determination is made then in step 724, the AFI tracking system 102 (e.g., server 116) repeats steps 718 to 724 for each type of batch in the alternative fuel mixture. If a positive determination is made in step 724, then the process ends.

Figure 7C:
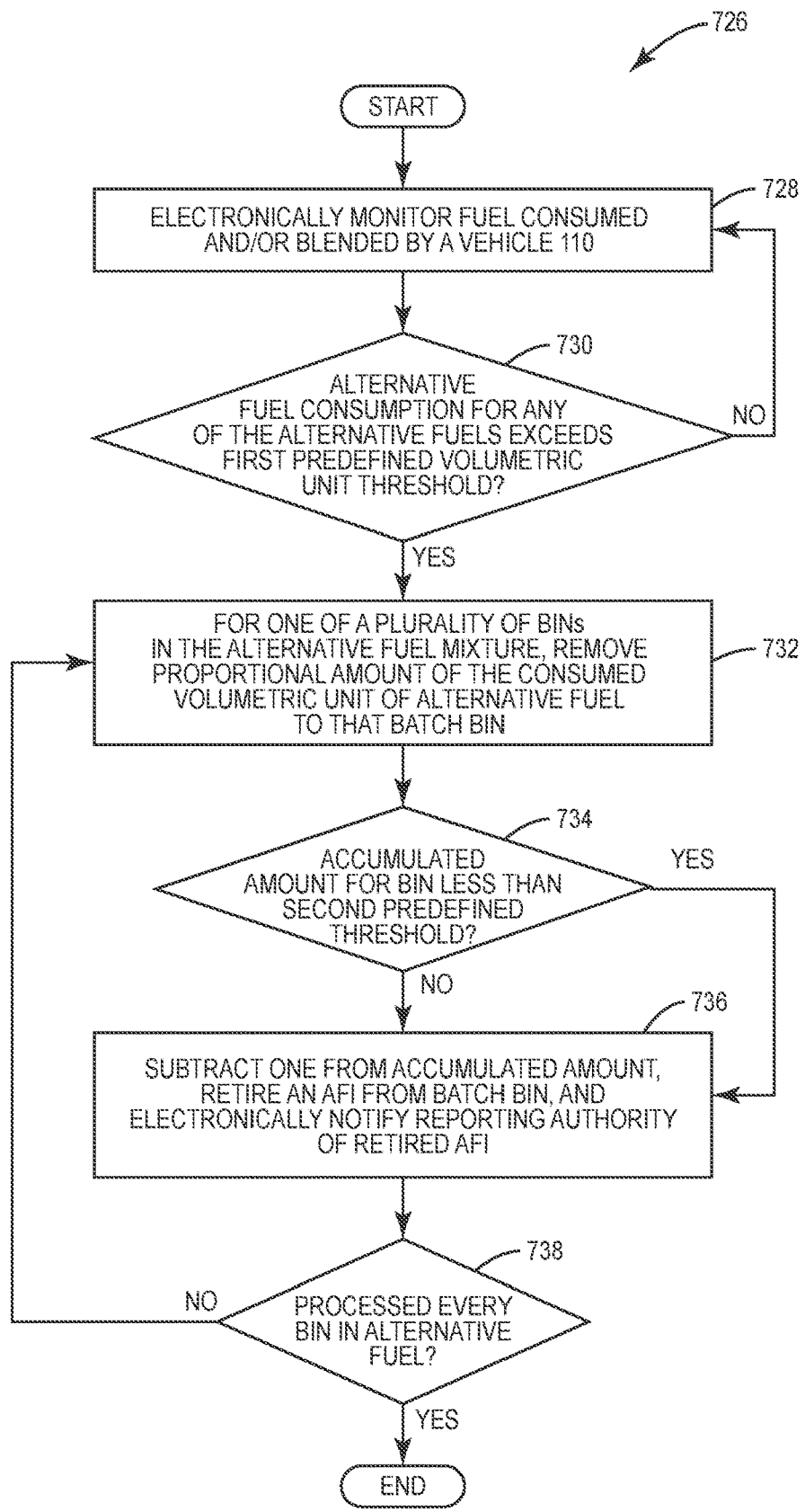
FIG. 7C is a flowchart illustrating processing by the AFI tracking system of FIGS. 1, 3 and 5 when alternative fuel is consumed and/or blended within a vehicle, according to one embodiment.

FIG. 7C is a flowchart 726 illustrating processing by the AFI tracking system 102 of FIGS. 1, 3 and 5 when alternative fuel is consumed and/or blended within a vehicle 110, according to one embodiment. In step 728, the AFI tracking system 102 (e.g., server 116 and/or onboard vehicle computer system) electronically monitors fuel consumed and/or blended by a vehicle 110. In step 730, the AFI tracking system 102 (e.g., server 116) determines whether alternative fuel consumption for any of the alternative fuels exceeds a first predefined volumetric unit threshold (e.g., exceeds one gallon). If a negative determination is made, then the process reverts back to step 728. If a positive determination is made in step 730, then the process proceeds to step 732. In step 732, the AFI tracking system 102 (e.g., server 116) allocates a proportional amount of the consumed volumetric unit of alternative fuel to each batch BIN of a plurality of BINs based on the percentage of that respective batch in the alternative fuel mixture. In step 734, the AFI tracking system 102 (e.g., server 116) determines whether the accumulated amount for the BIN is less than a second predefined threshold. In step 736, the AFI tracking system subtracts one from the accumulated amount, retires an AFI from the batch BIN, and electronically notifies the reporting authority of the retired AFI. In step 738, the AFI tracking system 102 (e.g., server 116) determines whether every BIN in the alternative fuel has been processed. If a negative determination is made, then the process repeats steps 732 to 738 for reach type of batch in the alternative fuel mixture.

Figure 8:
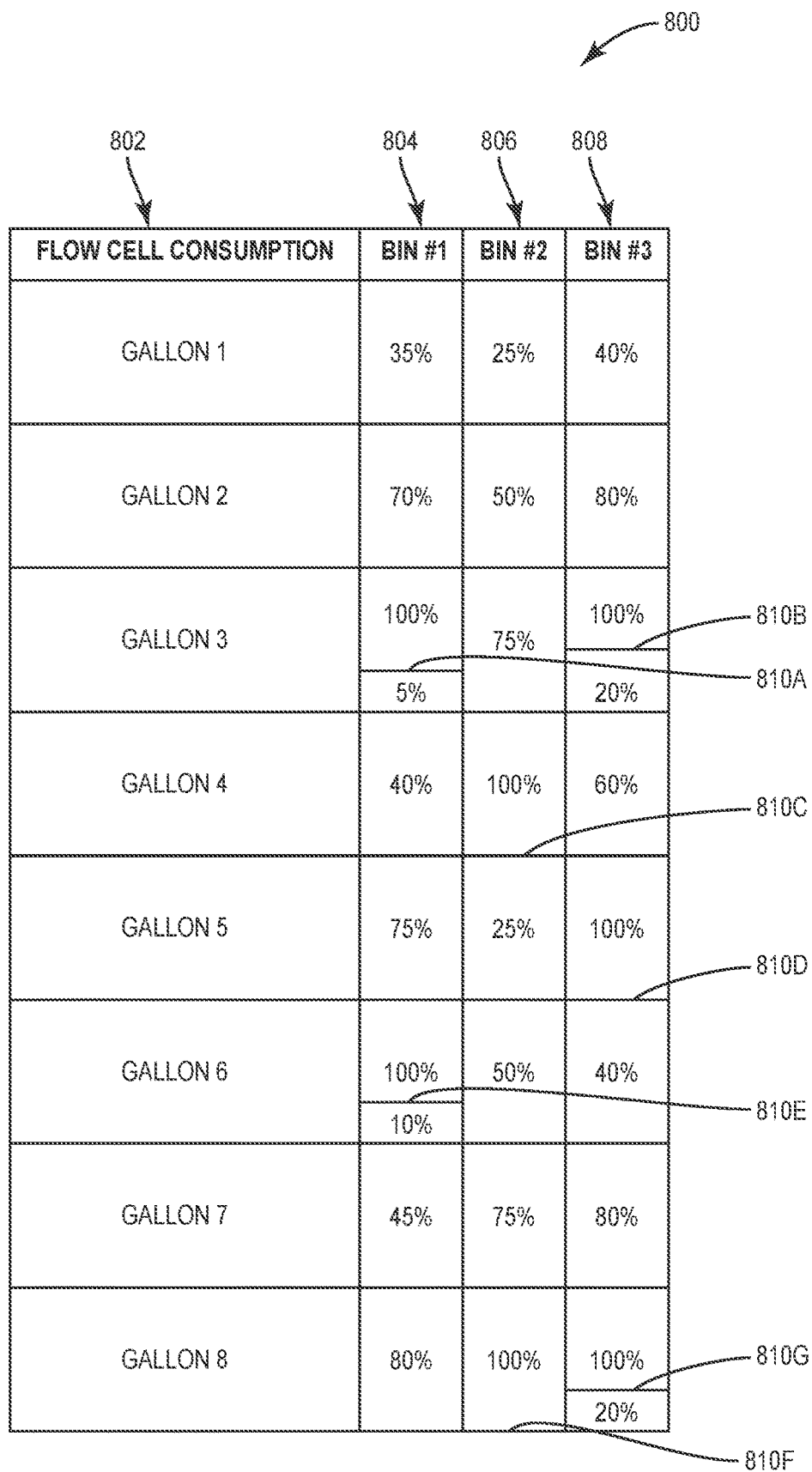
FIG. 8 is a chart illustrating release of AFIs by the AFI tracking system of FIGS. 1, 3 and 5 as alternative fuel is consumed by a vehicle of the plurality of vehicles of FIGS. 1 and 5, according to one embodiment.

FIG. 8 is a chart 800 illustrating release of AFIs by the AFI tracking system 102 of FIGS. 1, 3 and 5 as alternative fuel is consumed by one of the plurality of vehicles 110 of FIGS. 1 and 5, according to one embodiment. In particular, the chart 800 illustrates three different batches (BIN #1, BIN #2, BIN #3) within one vehicle container (e.g., tank). Each BIN represents a unique batch and/or feedstock. Each BIN has a plurality of AFIs (e.g., RIN range) associated with it. The chart shows a per gallons consumption (flow cell consumption 802) by the vehicle flow cell while tracking individual BIN consumption. Based on the percentage of each BIN within the alternative fuel mixture, the subsequent percentage of the consumed gallon is associated with its respective BIN. The AFI tracking system assigns an AFI once the fuel consumed reaches one gallon from that BIN. In other words, when the BIN usage reaches one gallon, an AFI (e.g., RIN) is detached and removed. This continues until all the gallons in the batch have been consumed. Further, the percentage of each batch consumed can be dynamically adjusted, such as if a new batch is added to the alternative fuel mixture.

In FIG. 8, each gallon (e.g., total gallons sum 100%) consumed (flow cell consumption 802) comprises 35% of BIN #1 804, 25% of BIN #2 806, and 40% BIN #3 808, according to one embodiment. Thus, the first gallon consumed by the vehicle comprises 35% of BIN #1 804, 25% of BIN #2 806, and 40% of BIN #3 808.

The second gallon consumed also comprises 35% of BIN #1 804, 25% of BIN #2 806, and 40% of BIN #3 808; however, the cumulative values of each BIN consumed comprises 70% for BIN #1 804, 50% for BIN #2 806, and 80% for BIN #3 808.

The third gallon consumed also comprises 35% of BIN #1 804, 25% of BIN #2 806, and 40% of BIN #3 808; however, the cumulative values of BIN #1 804 and BIN #3 808 exceed the 100% threshold. The cumulative value of BIN #2 806 consumed is 75%. More specifically, for the third gallon consumed, BIN #1 804 exceeds a gallon, and thus an AFI associated with BIN #1 804 is detached at the threshold 810A. Another 5% of BIN #1 804 is consumed for the third gallon. For the third gallon consumed, BIN #3 808 exceeds a gallon, and thus an AFI associated with BIN #3 808 is detached at threshold 810B. Another 20% of BIN #3 808 is consumed for the third gallon.

The fourth gallon consumed also comprises 35% of BIN #1 804, 25% of BIN #2 806, and 40% BIN #3 808; however, the cumulative value for BIN #2 806 exceeds the 100% threshold. More specifically, for the fourth gallon consumed, BIN #2 806 exceeds a gallon, and thus an AFI associated with BIN #2 806 is detached at the threshold 810C. For the fourth gallon consumed, the cumulative value for BIN #1 804 is 40% and for BIN #3 808 is 60%.

The fifth gallon consumed also comprises 35% of BIN #1 804, 25% of BIN #2 806, and 40% of BIN #3 808; however, the cumulative value of BIN #3 808 exceeds the 100% threshold. The cumulative value of BIN #1 804 consumed is 75% and the cumulative value of BIN #2 806 consumed is 25%. More specifically, for the fifth gallon consumed, BIN #3 808 exceeds a gallon, and thus an AFI associated with BIN #3 808 is detached at threshold 810D.

The sixth gallon consumed also comprises 35% of BIN #1 804, 25% of BIN #2 806, and 40% of BIN #3 808; however, the cumulative value of BIN #1 804 exceeds the 100% threshold. The cumulative value of BIN #2 806 consumed is 50% and the cumulative value of BIN #3 808 consumed is 40%. More specifically, for the fifth gallon consumed, BIN #1 804 exceeds a gallon, and thus an AFI associated with BIN #1 804 is detached at threshold 810E. Another 10% of BIN #1 804 is consumed for the sixth gallon.

The seventh gallon consumed also comprises 35% of BIN #1 804, 25% of BIN #2 806, and 40% of BIN #3 808; however, the cumulative values of each BIN consumed comprises 45% for BIN #1 804, 75% for BIN #2 806, and 80% for BIN #3 808.

The eighth gallon consumed also comprises 35% of BIN #1 804, 25% of BIN #2 806, and 40% of BIN #3 808; however, the cumulative values of BIN #2 806 and BIN #3 808 exceed the 100% threshold. The cumulative value of BIN #1 804 consumed is 80%. More specifically, for the eighth gallon consumed, BIN #2 806 exceeds a gallon, and thus an AFI associated with BIN #2 806 is detached at threshold 810F. For the eighth gallon consumed, BIN #3 808 exceeds a gallon, and thus an AFI associated with BIN #3 808 is detached at threshold 810G. Another 20% of BIN #3 808 is consumed for the eighth gallon.

Figure 9A:
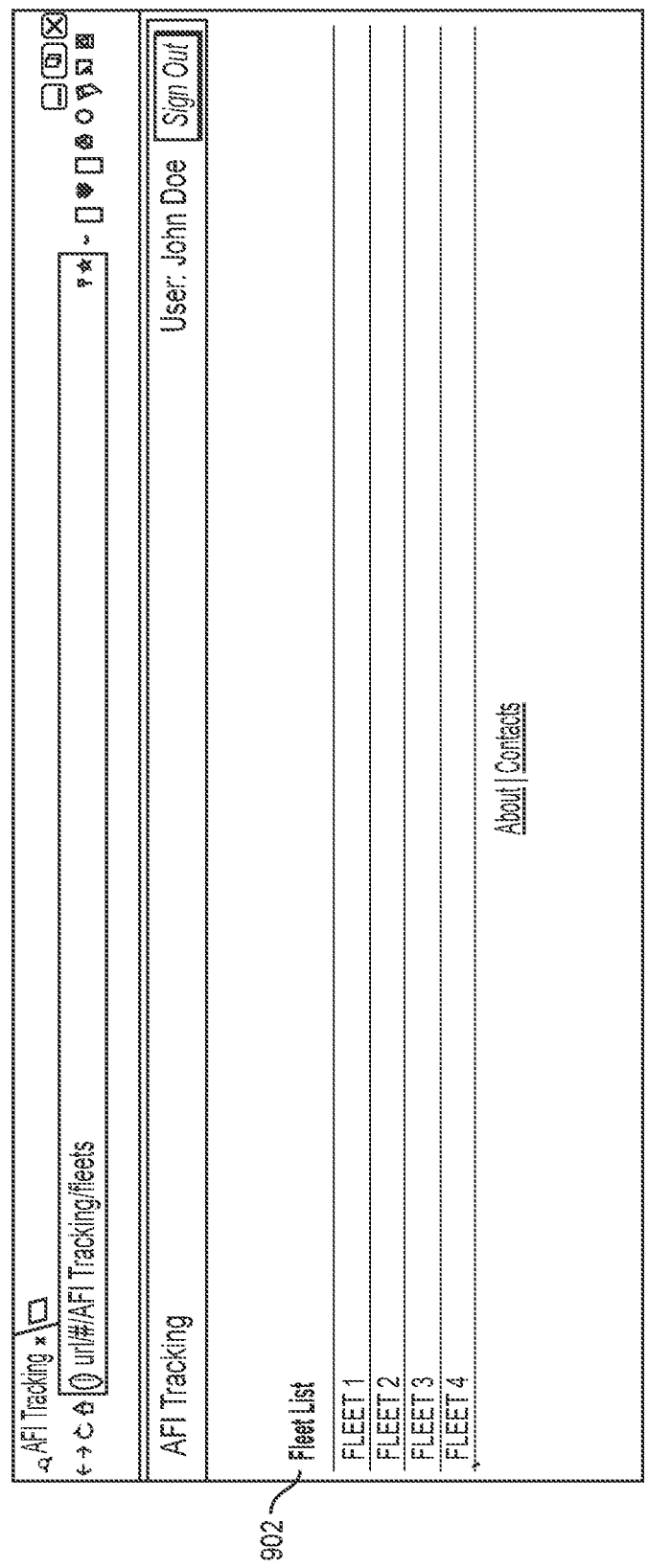
FIG. 9A is a fleet list page provided by the AFI tracking system of FIGS. 1, 3 and 5 illustrating a fleet list, according to one embodiment.
Figure 9B:
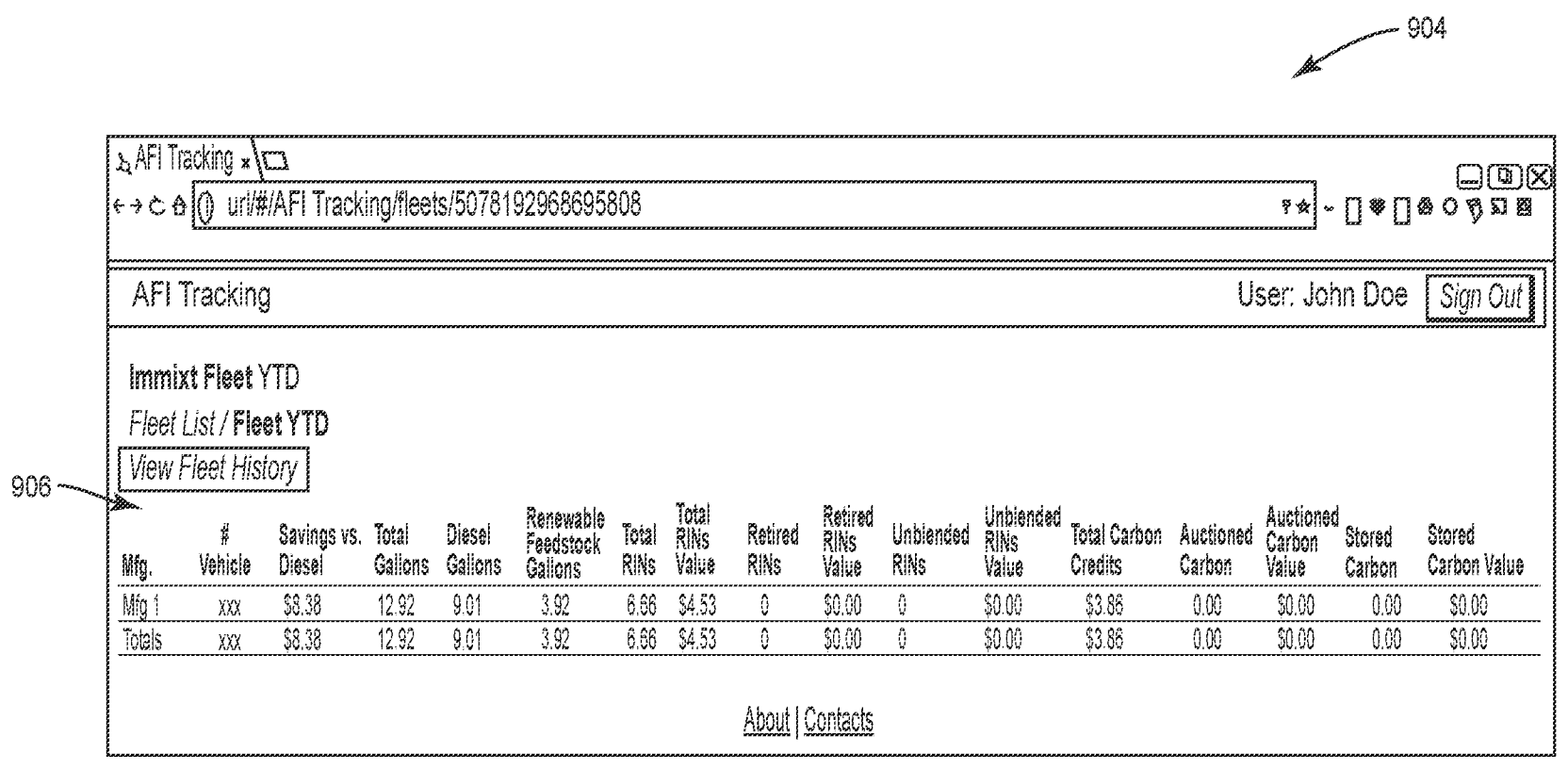

FIGS. 9A-9I are pages provided by the AFI tracking system 102 of FIGS. 1, 3 and 5 illustrating tracking functionality provided by the AFI tracking system 102. More specifically, FIG. 9A is a fleet list page 900 provided by the AFI tracking system 102 of FIGS. 1, 3 and 5 illustrating a fleet list 902, according to one embodiment. As shown, the fleet list 902 comprises a plurality of different fleets (e.g., Fleet 1, Fleet 2, Fleet 3, Fleet 4, etc.). FIG. 9B is a fleet list page 904 provided by the AFI tracking system 102 of FIGS. 1, 3 and 5 illustrating a vehicle list 906 within a fleet of vehicles, according to one embodiment. The vehicle list 906 lists various vehicles within the fleet of vehicles and associated data. For example, in certain embodiments, the associated data comprises engine manufacturer, vehicle number, savings vs. diesel, total gallons, diesel gallons, renewable feedstock gallons, total RINs, total RINs value, retired RINs, retired RINs value, unblended RINs, unblended RINs value, total carbon credits, auctioned carbon, auctioned carbon value, stored carbon, stored carbon value, etc.

Figure 9C:
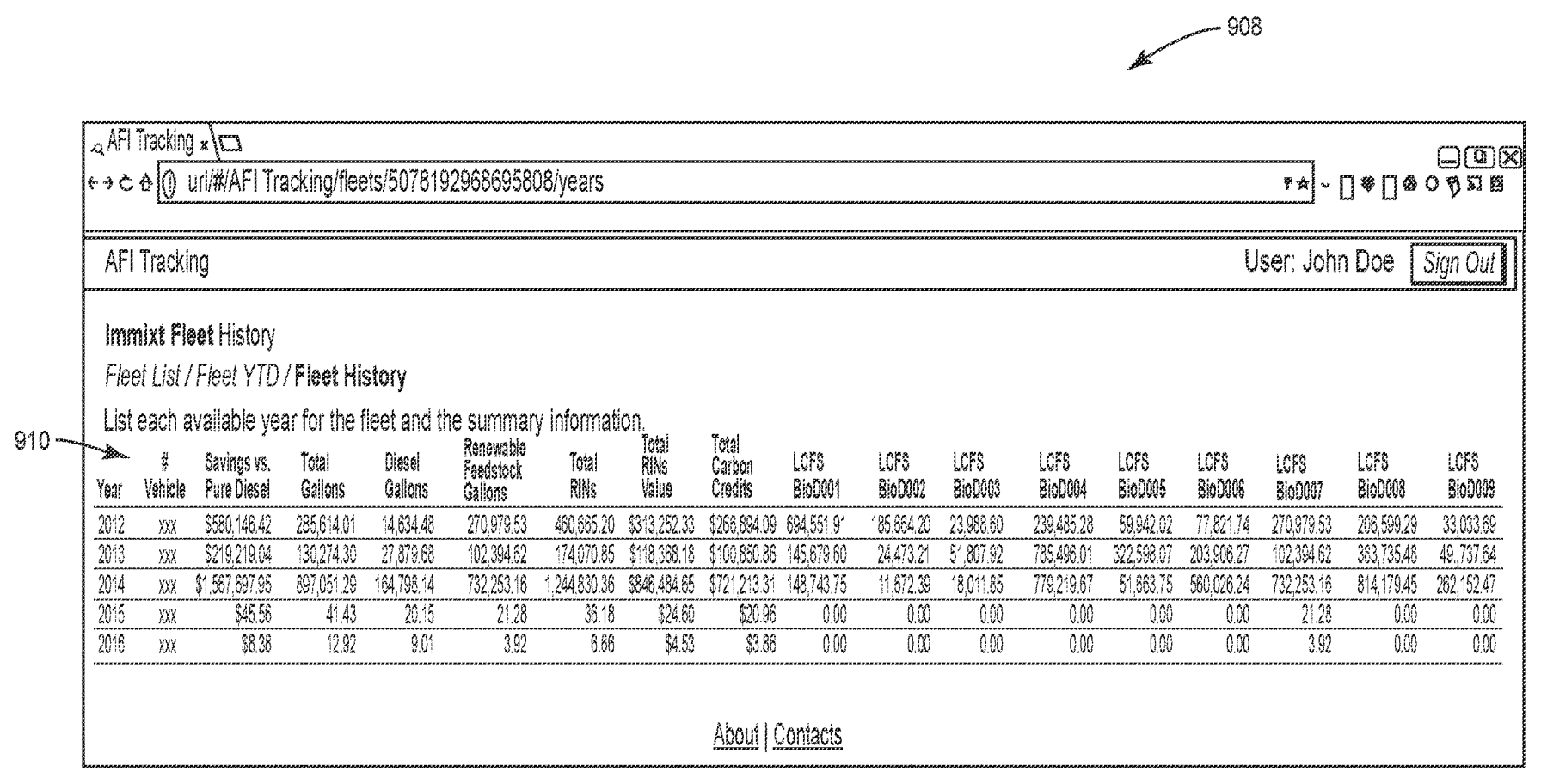

FIG. 9C is a fleet list page 908 provided by the AFI tracking system 102 of FIGS. 1, 3 and 5 illustrating summary fleet history information 910, according to one embodiment. In particular, the fleet list page 908 displays a list of available years and summary information for each year. For example, in certain embodiments, the summary information comprises a year, vehicle number, savings vs. pure diesel, total gallons, diesel gallons, renewable feedstock gallons, total RINs, total RINs value, total carbon credits, LCFS BioD001 (e.g., CI Feedstock 1), LCFS BioD002 (e.g., CI Feedstock 2), LCFS BioD003 (e.g., CI Feedstock 3), LCFS BioD004 (e.g., CI Feedstock 4), LCFS BioD005 (e.g., CI Feedstock 5), LCFS BioD006 (e.g., CI Feedstock 6), LCFS BioD007 (e.g., CI Feedstock 7), LCFS BioD008 (e.g., CI Feedstock 8), LCFS BioD009 (e.g., CI Feedstock 9), etc. More specifically, LCFS BioD001-BioD009 are used by LCFS to identify specific types of feedstock, although any other feedstock identification scheme could be used (e.g., depending on governmental nomenclature, reporting requirements, etc.). For example, LCFS BioD001 is soy oil (CI of 83.25), LCFS BioD002 is used cooking oil cooked (CI of 15.84), LCFS BioD003 is used cooking oil (CI of 11.76), LCFS BioD004 is used cooking oil cooked mid-west produced (CI of 18.72), LCFS BioD005 is used cooking oil mid-west produced (CI of 13.83), LCFS BioD006 is canola oil (CI of 62.99), LCFS BioD007 is corn oil (CI of 4), LCFS BioD008 is animal fat (CI of 40.18), and LCFS BioD009 is tallow (CI of 34.11).

Figure 9D:
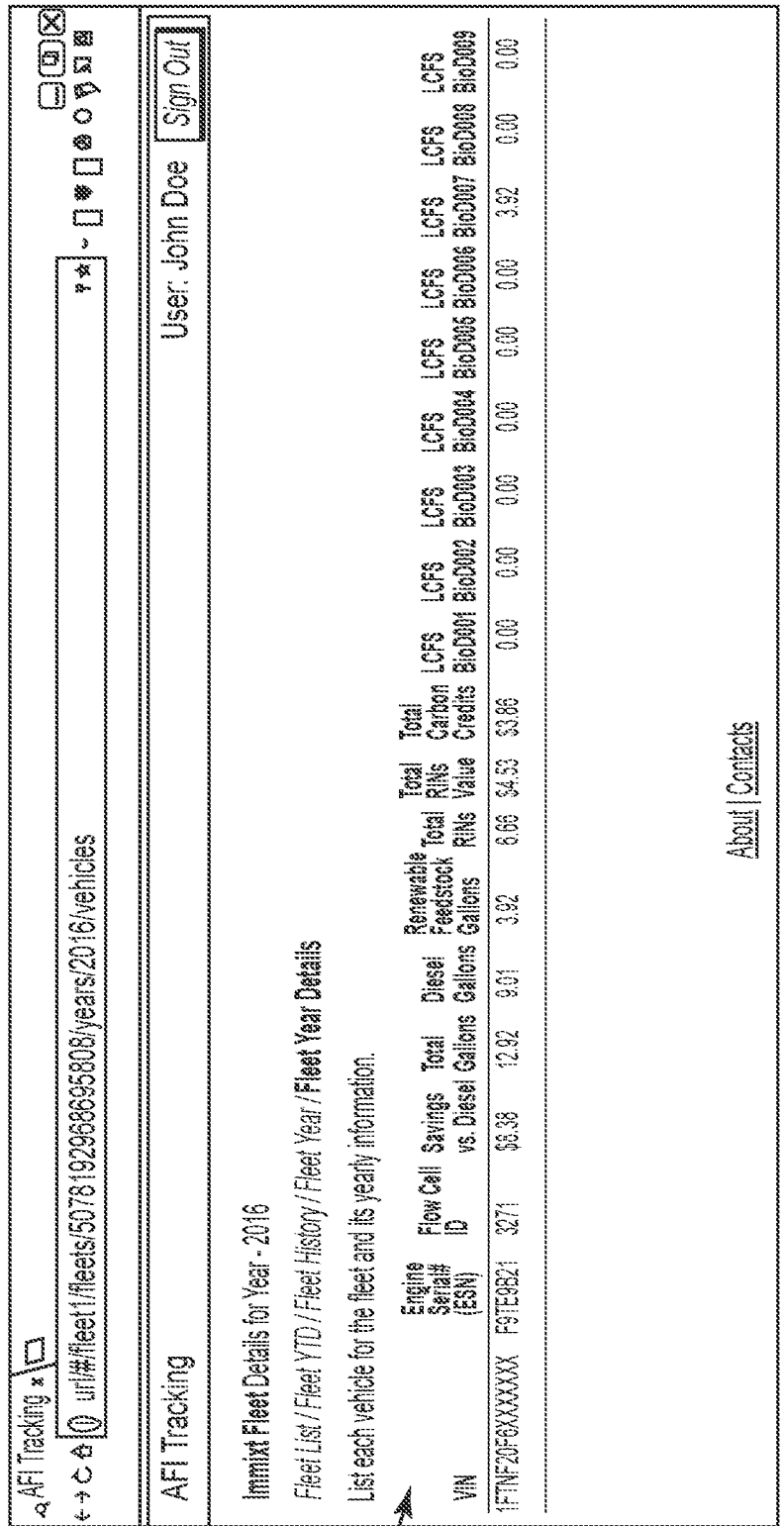
FIG. 9D is a fleet year details page provided by the AFI tracking system of FIGS. 1, 3 and 5 illustrating a fleet year summary for a fleet of vehicles for a selected year, according to one embodiment.

FIG. 9D is a fleet year details page 912 provided by the AFI tracking system 102 of FIGS. 1, 3 and 5 illustrating a fleet year summary 914 for a fleet of vehicles for a selected year, according to one embodiment. In particular, the fleet year summary 914 displays a list of each vehicle within a fleet and annual individual vehicle summary information for a particular year (e.g., 2016). For example, in certain embodiments, the annual individual vehicle summary information comprises a VIN (vehicle identification number), engine serial number (ESN), Flow Cell ID, savings vs. diesel, total gallons, diesel gallons, renewable feedstock gallons, total RINs, total RINs value, total carbon credits, LCFS BioD001 (e.g., CI Feedstock 1), LCFS BioD002 (e.g., CI Feedstock 2), LCFS BioD003 (e.g., CI Feedstock 3), LCFS BioD004 (e.g., CI Feedstock 4), LCFS BioD005 (e.g., CI Feedstock 5), LCFS BioD006 (e.g., CI Feedstock 6), LCFS BioD007 (e.g., CI Feedstock 7), LCFS BioD008 (e.g., CI Feedstock 8), LCFS BioD009 (e.g., CI Feedstock 9), etc.

FIG. 9E is a fleet vehicle history page 916 provided by the AFI tracking system 102 of FIGS. 1, 3 and 5 illustrating a fleet vehicle history 918 for a selected vehicle in the fleet of vehicles, according to one embodiment. The selected vehicle could be identified by the VIN. In particular, the AFI tracking system displays a list of RIN associated entries for a particular vehicle, including route information. For example, in certain embodiments, the route information comprises a day, route, saving vs diesel, total gallons, diesel gallons, renewable feedstock gallons, total RINs, total RINs value, total carbon credits, LCFS BioD001 (e.g., CI Feedstock 1), LCFS BioD002 (e.g., CI Feedstock 2), LCFS BioD003 (e.g., CI Feedstock 3), LCFS BioD004 (e.g., CI Feedstock 4), LCFS BioD005 (e.g., CI Feedstock 5), LCFS BioD006 (e.g., CI Feedstock 6), LCFS BioD007 (e.g., CI Feedstock 7), LCFS BioD008 (e.g., CI Feedstock 8), LCFS BioD009 (e.g., CI Feedstock 9), etc.

Figure 9F:
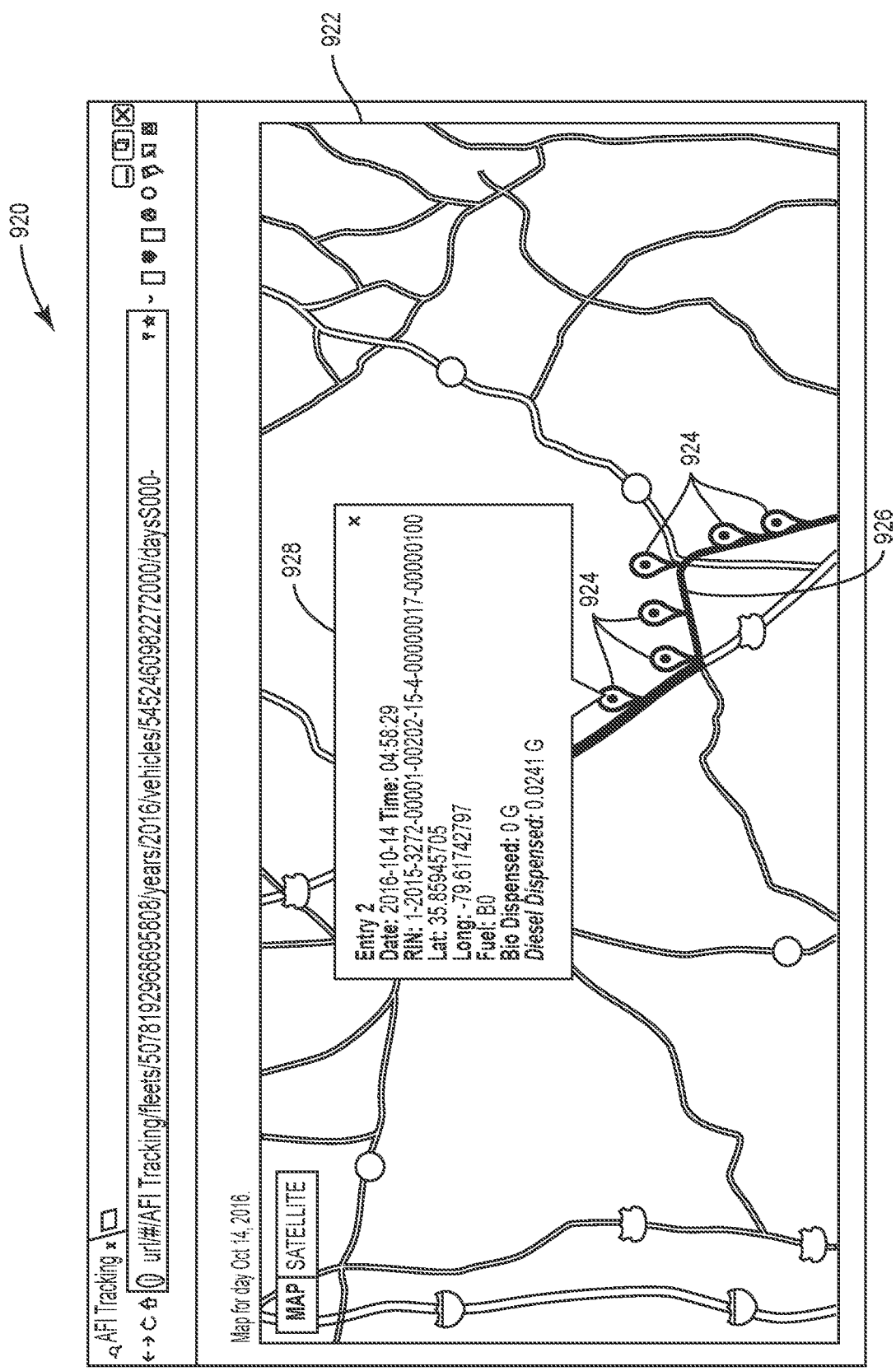
FIG. 9F is a vehicle history map page provided by the AFI tracking system of FIGS. 1, 3 and 5 illustrating a vehicle history map for a selected vehicle in the fleet of vehicles, according to one embodiment.

FIG. 9F is a vehicle history map page 920 provided by the AFI tracking system 102 of FIGS. 1, 3 and 5 illustrating a vehicle history map 922 for a selected vehicle in the fleet of vehicles, according to one embodiment. In particular, the vehicle history map 922 includes markers 924 for each AFI (e.g., RIN) associated entry for the particular vehicle along a particular route 926, thereby allowing a user to visually view AFI entry information 928 for a particular vehicle along a particular route 926. For example, clicking a particular marker 924 displays AFI entry information 928 which may include the entry number (e.g., entry 2), date (e.g., 2016-10-14), time (e.g., 04:58:29), RIN (e.g., 1-2015-3272-00001-00202-15-4-00000017-00000100), latitude (e.g., 35.85945705), longitude (e.g., −79.61742797), proportion of diesel fuel to alternative fuel (e.g., BO), biofuel dispensed (e.g., 0 G), diesel fuel dispensed (e.g., 0.0241 G), etc.

Figure 9G:
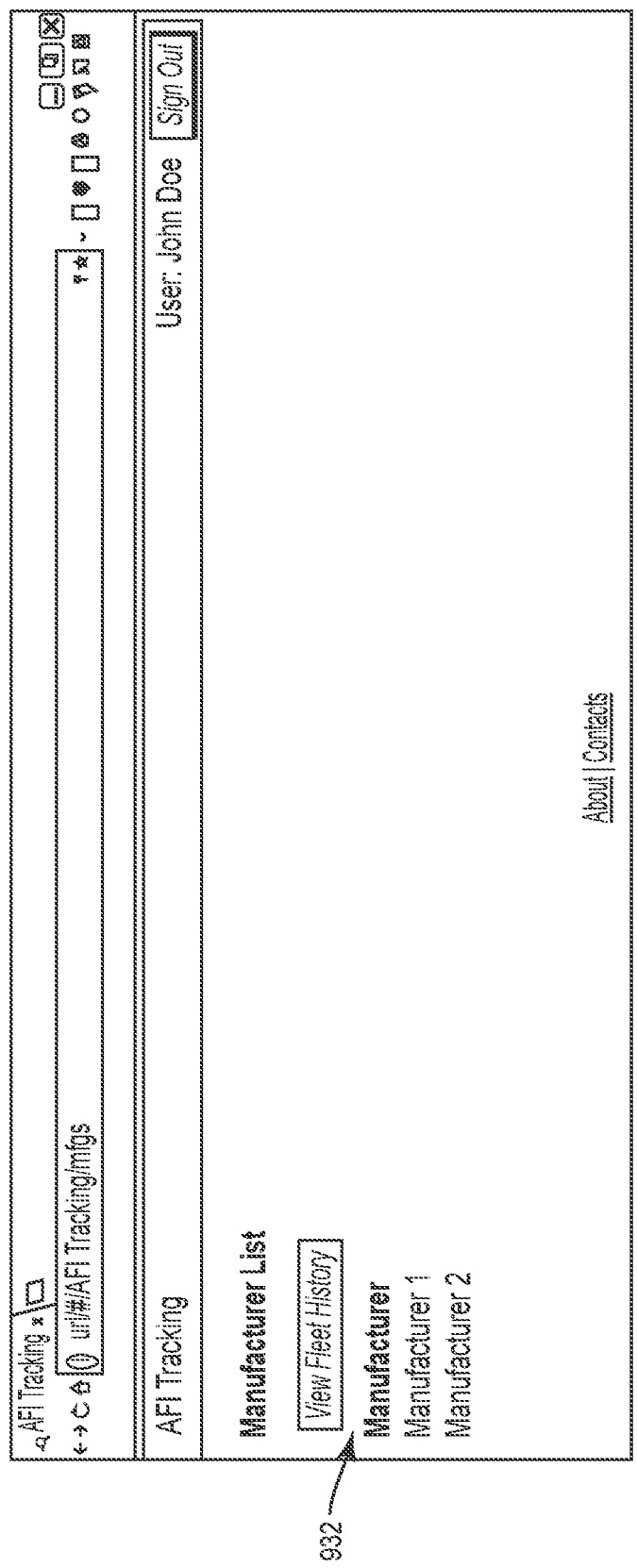
FIG. 9G is a manufacturer list page provided by the AFI tracking system of FIGS. 1, 3 and 5 illustrating a manufacturer list of engine manufacturers, according to one embodiment.
Figure 9I:
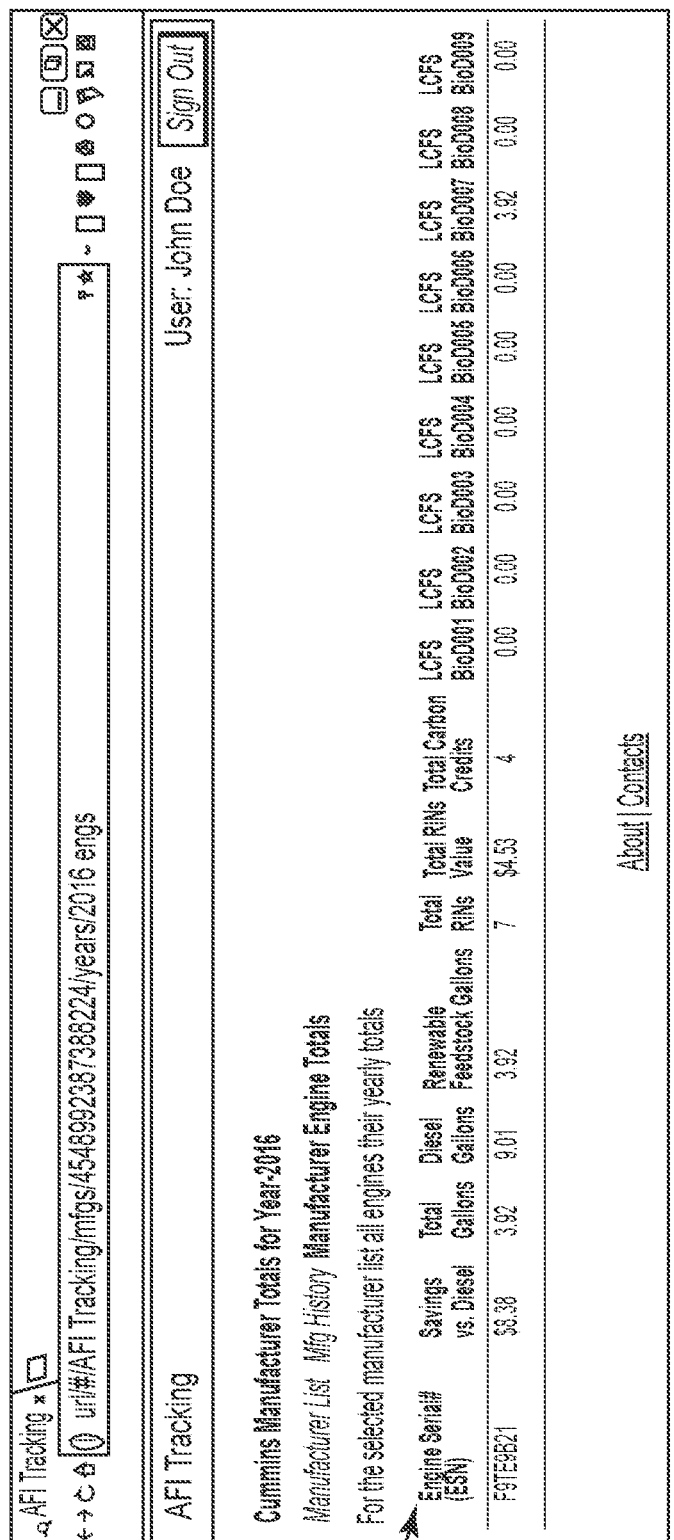
FIG. 9I is a manufacturer engine totals page provided by the AFI tracking system of FIGS. 1, 3 and 5 illustrating individual vehicle yearly totals for a selected engine, according to one embodiment.

FIGS. 9G-9I are pages provided by the AFI tracking system of FIGS. 1, 3 and 5 illustrating summary information tailored for engine manufacturers. More specifically, FIG. 9G is a manufacturer list page 930 provided by the AFI tracking system of FIGS. 1, 3 and 5 illustrating a manufacturer list 932 of engine manufacturers, according to one embodiment. As shown, the manufacturer list 932 comprises a plurality of different engine manufacturers (e.g., Manufacturer 1, Manufacturer 2, etc.). FIG. 9H is a manufacturer yearly totals page 934 provided by the AFI tracking system of FIGS. 1, 3 and 5 illustrating total vehicles yearly totals 936 for a selected engine manufacturer, according to one embodiment. For example, in certain embodiments, the total vehicles yearly totals 936 comprise the year, number of vehicles, savings vs. pure diesel, total gallons, diesel gallons, renewable feedstock gallons, total RINs, total RINs value, total carbon credits, LCFS BioD001 (e.g., CI Feedstock 1), LCFS BioD002 (e.g., CI Feedstock 2), LCFS BioD003 (e.g., CI Feedstock 3), LCFS BioD004 (e.g., CI Feedstock 4), LCFS BioD005 (e.g., CI Feedstock 5), LCFS BioD006 (e.g., CI Feedstock 6), LCFS BioD007 (e.g., CI Feedstock 7), LCFS BioD008 (e.g., CI Feedstock 8), LCFS BioD009 (e.g., CI Feedstock 9), etc. FIG. 9I is a manufacturer engine totals page 938 provided by the AFI tracking system 102 of FIGS. 1, 3 and 5 illustrating individual engine yearly totals 940 for a selected engine, according to one embodiment. For example, in certain embodiments, the individual vehicle yearly totals 940 comprise the engine serial number (ESN), savings vs. diesel, total gallons, diesel gallons, renewable feedstock gallons, total RINs, total RINs value, total carbon credits, LCFS BioD001 (e.g., CI Feedstock 1), LCFS BioD002 (e.g., CI Feedstock 2), LCFS BioD003 (e.g., CI Feedstock 3), LCFS BioD004 (e.g., CI Feedstock 4), LCFS BioD005 (e.g., CI Feedstock 5), LCFS BioD006 (e.g., CI Feedstock 6), LCFS BioD007 (e.g., CI Feedstock 7), LCFS BioD008 (e.g., CI Feedstock 8), LCFS BioD009 (e.g., CI Feedstock 9), etc.

Figure 10:
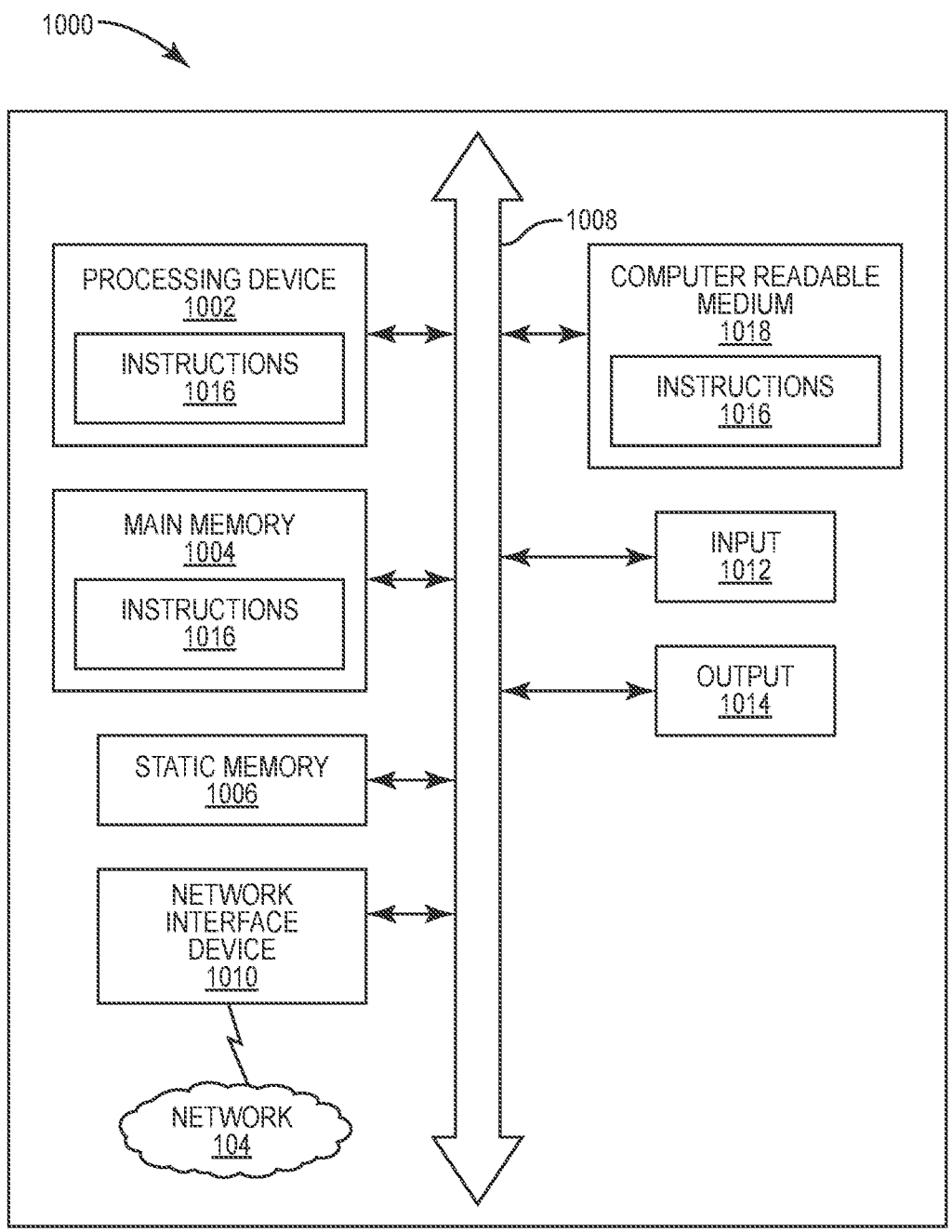
FIG. 10 is a schematic diagram of a generalized representation of a computer system that can be included in any component in an alternative fuel life-cycle tracking system and/or an AFI tracking system, according to one embodiment.

FIG. 10 is a schematic diagram of a generalized representation of a computer system 1000 that can be included in any component in an alternative fuel life-cycle tracking system and/or an AFI tracking system, according to one embodiment. In this regard, the computer system 1000 is adapted to execute instructions from a computer-readable medium to perform these and/or any of the functions or processing described herein.

In this regard, the computer system 1000 in FIG. 10 may include a set of instructions that may be executed to program and configure programmable digital signal processing circuits for supporting scaling of supported communications services. The computer system 1000 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1000 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The computer system 1000 in this embodiment includes a processing device or processor 1002, a main memory 1004 (e.g., read-only memory (ROM), flash memory, dynamic random access memory (DRAM), such as synchronous DRAM (SDRAM), etc.), and a static memory 1006 (e.g., flash memory, static random access memory (SRAM), etc.), which may communicate with each other via a data bus 1008. Alternatively, the processing device 1002 may be connected to the main memory 1004 and/or static memory 1006 directly or via some other connectivity means. The processing device 1002 may be a controller, and the main memory 1004 or static memory 1006 may be any type of memory.

The processing device 1002 represents one or more general-purpose processing devices, such as a microprocessor, central processing unit, or the like. More particularly, the processing device 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 1002 is configured to execute processing logic in instructions for performing the operations and steps discussed herein.

The computer system 1000 may further include a network interface device 1010. The computer system 1000 also may or may not include an input 1012, configured to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer readable medium 1018. The instructions 1016 may also reside, completely or at least partially, within the main memory 1004 and/or within the processing device 1002 during execution thereof by the computer system 1000, the main memory 1004 and the processing device 1002 also constituting computer readable medium. The instructions 1016 may further be transmitted or received over a network 104 via the network interface device 1010.

While the computer readable medium 1018 is shown in an embodiment to be a single medium, the term "computer-readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding, or carrying a set of instructions for execution by the processing device and that cause the processing device to perform any one or more of the methodologies of the embodiments disclosed herein. The term "computer readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer readable medium) having stored thereon instructions which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or a similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems is disclosed in the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer readable medium and executed by a processor or other processing device, or combinations of both. The components of the distributed AFI tracking system described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer readable medium known in the art. A storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the embodiments may be combined. Those of skill in the art will also understand that information and signals may be represented using any of a variety of technologies and techniques. For example, data, instructions, commands, information, signals, bits, symbols, and chips, which may be referenced throughout the above description, may be represented by voltages, currents, electromagnetic waves, magnetic fields, particles, optical fields, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A method for alternative fuel tracking, the method comprising:
    electronically receiving, at a remote server, first alternative fuel data of a first alternative fuel in a first container, the first alternative fuel comprising a storage volume comprising a first batch and a second batch, the first alternative fuel data comprising a first set of alternative fuel identifiers (AFIs) associated with a volume of the first batch and a second set of AFIs associated with a volume of the second batch;
    electronically receiving, at the remote server, a transfer volume of the first alternative fuel being transferred to a second container on-board a vehicle, the transfer volume being a subset of the storage volume;
    automatically and electronically transferring, at the remote server, a first subset of the first set of AFIs to be electronically associated with the second container and a second subset of the second set of AFIs to be electronically associated with the second container, the transfer of the first subset and the second subset being based on the transfer volume and based on a first volumetric proportion of the volume of the first batch to the volume of the second batch;
    controlling a blend ratio of alternative fuel in the second container to primary fuel in a primary fuel container on-board the vehicle based at least in part on one or more characteristics of the first alternative fuel; and
    electronically monitoring, at the remote server, consumption of the first alternative fuel within the second container.

2. The method of claim 1, further comprising electronically receiving, at the remote server, location data as to where the first alternative fuel was consumed.

3. The method of claim 1, further comprising detaching, by the remote server, a first portion of the first subset of the first set of AFIs and a second portion of the second subset of the second set of AFIs, the first portion and the second portion being based on a consumed volume of the first alternative fuel and based on the first volumetric proportion.

4. The method of claim 3, further comprising automatically electronically transmitting, by the remote server, consumption information of the detached first portion and the detached second portion to a reporting authority.

5. The method of claim 1, further comprising consolidating AFIs of the first subset and the second subset according to feedstock within the first batch and the second batch.

6. The method of claim 5, further comprising detaching, by the remote server, a first portion of the consolidated AFIs associated with a first feedstock and a second portion of the consolidated AFIs associated with a second feedstock, the first portion and the second portion being based on a consumed volume of the first alternative fuel and based on a volumetric proportion of the first feedstock to the second feedstock.

7. The method of claim 1, further comprising electronically consolidating the first subset of the first set of AFIs and the second subset of the second set of AFIs with a third set of AFIs associated with a volume of a third batch in the second container, the volume of the third batch being in the second container prior to transfer of the transfer volume of the first alternative fuel.

8. The method of claim 1, further comprising electronically consolidating the first subset of the first set of AFIs and the second subset of the second set of AFIs with a third set of AFIs associated with a volume of a third batch of a second alternative fuel transferred to the second container, the volume of the third batch being added to the second container after transfer of the transfer volume of the first alternative fuel.

9. A system for alternative fuel life-cycle tracking, comprising:
   a remote server in electronic communication with an electronic communication device of a first container and an electronic communication device of a second container, the remote server comprising a processor and a memory coupled to the processor; and
   an alternative fuel identifier (AFI) tracking engine electronically stored in the memory of the remote server, wherein the AFI tracking engine is configured to:
      electronically receive first alternative fuel data of a first alternative fuel in the first container, the first alternative fuel comprising a storage volume comprising a first batch and a second batch, and the first alternative fuel data comprising a first set of alternative fuel identifiers (AFIs) associated with a volume of the first batch and a second set of AFIs associated with a volume of the second batch;
      electronically receive a transfer volume of the first alternative fuel being transferred to the second container on-board a vehicle, the transfer volume being a subset of the storage volume; and
      automatically and electronically transfer a first subset of the first set of AFIs to be electronically associated with the second container and a second subset of the second set of AFIs to be electronically associated with the second container, the transfer of the first subset and the second subset being based on the transfer volume and based on a first volumetric proportion of the volume of the first batch to the volume of the second batch;
      electronically monitor consumption of the first alternative fuel within the second container; and
   a blend controller on-board the vehicle, the blend controller configured to control a blend ratio of alternative fuel in the second container to primary fuel in a primary fuel container on-board the vehicle based at least in part on one or more characteristics of the first alternative fuel.

10. The system of claim 9, wherein the AFI tracking engine is further configured to electronically receive location data as to where the alternative fuel was consumed.

11. The system of claim 9, wherein the AFI tracking engine is further configured to detach a first portion of the first subset of the first set of AFIs and a second portion of the second subset of the second set of AFIs, the first portion and the second portion being based on a consumed volume of the first alternative fuel and based on the first volumetric proportion.

12. The system of claim 11, wherein the AFI tracking engine is further configured to automatically electronically transmit consumption information of the detached first portion and the detached second portion to a reporting authority.

13. The system of claim 9, wherein the AFI tracking engine is further configured to consolidate AFIs of the first subset and the second subset according to feedstock within the first batch and the second batch.

14. The system of claim 13, wherein the AFI tracking engine is further configured to detach a first portion of the consolidated AFIs associated with a first feedstock and a second portion of the consolidated AFIs associated with a second feedstock, the first portion and the second portion being based on a consumed volume of the first alternative fuel and based on a volumetric proportion of the first feedstock to the second feedstock.

15. The system of claim 9, wherein the AFI tracking engine is further configured to electronically consolidate the first subset of the first set of AFIs and the second subset of the second set of AFIs with a third set of AFIs associated with a volume of a third batch in the second container, the volume of the third batch being in the second container prior to transfer of the transfer volume of the first alternative fuel.

16. The system of claim 9, wherein the AFI tracking engine is further configured to electronically consolidate the first subset of the first set of AFIs and the second subset of the second set of AFIs with a third set of AFIs associated with a volume of a third batch of a second alternative fuel transferred to the second container, the volume of the third batch being added to the second container after transfer of the transfer volume of the first alternative fuel.

17. The system of claim 9, wherein the system further comprises an electronic fuel transfer monitoring device configured to be in electronic communication with a sensor, wherein the sensor is configured to measure the transfer volume of the first alternative fuel.

18. The system of claim 17, wherein the sensor is further configured to detect types of feedstocks within the first alternative fuel.

* * * * *